(12) United States Patent
Cui et al.

(10) Patent No.: US 11,521,417 B2
(45) Date of Patent: Dec. 6, 2022

(54) TOUCH PANEL, TOUCH RECOGNITION METHOD AND TOUCH DEVICE

(71) Applicant: BOE TECHNOLOGY GROUP CO., LTD., Beijing (CN)

(72) Inventors: Liang Cui, Beijing (CN); Haisheng Wang, Beijing (CN); Xiaoliang Ding, Beijing (CN); Yingming Liu, Beijing (CN); Pengpeng Wang, Beijing (CN); Ping Zhang, Beijing (CN); Yubo Wang, Beijing (CN); Xiufeng Li, Beijing (CN); Yuanyuan Ma, Beijing (CN)

(73) Assignee: BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/355,776

(22) Filed: Jun. 23, 2021

(65) Prior Publication Data

US 2021/0405808 A1 Dec. 30, 2021

(30) Foreign Application Priority Data

Jun. 30, 2020 (CN) .......................... 202010616490.3

(51) Int. Cl.
*G06V 40/13* (2022.01)
*G06F 3/041* (2006.01)
*G06F 3/043* (2006.01)

(52) U.S. Cl.
CPC .......... *G06V 40/1306* (2022.01); *G06F 3/043* (2013.01); *G06F 3/0416* (2013.01)

(58) Field of Classification Search
CPC ... G06V 40/1306; G06F 3/0416; G06F 3/043; G05B 19/0423; G05B 2219/25257
See application file for complete search history.

(56) References Cited

U.S. PATENT DOCUMENTS

2021/0056278 A1* 2/2021 Wang ................. G06V 40/1306

FOREIGN PATENT DOCUMENTS

| CN | 110221720 A | 9/2019 |
| CN | 110472606 A | 11/2019 |

(Continued)

OTHER PUBLICATIONS

China Patent Office, First Office Action dated Mar. 8, 2021, for corresponding Chinese application No. 202010616490.3.

*Primary Examiner* — Jonathan A Boyd
(74) *Attorney, Agent, or Firm* — Houtteman Law LLC

(57) ABSTRACT

The present disclosure provides a touch panel including: a touch region having a plurality of ultrasonic signal detection circuits and a reference region having a plurality of reference circuits, each ultrasonic signal detection circuit includes an ultrasonic sensor and a first driving circuit; the ultrasonic sensor includes a first electrode, a second electrode, and a dielectric layer between the first electrode and the second electrode, the first driving circuit is configured to drive the ultrasonic sensor; each of the plurality of reference circuits includes a reference transceiver and a second driving circuit, the reference transceiver includes a third electrode, a fourth electrode, and a dielectric layer between the third electrode and the fourth electrode; the second driving circuit is configured to drive the reference transceiver; the dielectric layer of the ultrasonic sensor has piezoelectric sensitivity; the dielectric layer of the reference transceiver does not have the piezoelectric sensitivity.

20 Claims, 6 Drawing Sheets

(56) References Cited

FOREIGN PATENT DOCUMENTS

CN          111274983 A     6/2020
WO    WO2008128989 A1   10/2008

\* cited by examiner

TOUCH PANEL, TOUCH RECOGNITION METHOD AND TOUCH DEVICE

CROSS REFERENCE TO RELATED APPLICATIONS

The present application claims the priority of the Chinese Patent Application No. 202010616490.3 filed on Jun. 30, 2020, the content of which is incorporated herein by reference in its entirety.

TECHNICAL FIELD

The present disclosure relates to the field of touch control, in particular to a touch panel, a touch recognition method and a touch device.

BACKGROUND

Most of current display devices have a touch function. From an operating principle, a touch display device includes a capacitive touch display device, a resistive touch display device, a photoelectric touch display device, an ultrasonic touch display device, and the like.

When an operator performs a touch operation, the operator needs to directly touch a surface of the touch display device with a finger. Particles, dust and the like may adhere to the surface of the touch display device, and the fingers of the operator have grease. For the capacitive touch display device, the resistive touch display device, and the photoelectric touch display device, touch sensitivity will be decreased without cleaning. The ultrasonic touch display device does not have such a problem. Ultrasonic fingerprint recognition technology is an under-screen fingerprint recognition method. The ultrasonic wave is a sound wave with a frequency higher than 20 KHz, and has characteristics of strong penetration, good directivity, high safety, no need of screen lightening and the like. The ultrasonic wave may penetrate through water, oil, sweat stain and the like on the hand of a person, and has a higher anti-stain ability and is not influenced by light. Therefore, it has become one of mainstream research and development directions of a current display device to strive to develop the ultrasonic touch display device.

SUMMARY

An object of the present disclosure is to provide a touch panel, a touch recognition method for the touch panel, and a touch device.

In a first aspect of the present disclosure, the present disclosure provides a touch panel, wherein the touch panel includes a touch region and a reference region, the touch region includes a plurality of ultrasonic signal detection circuits, the reference region includes a plurality of reference circuits, each of the plurality of ultrasonic signal detection circuits includes an ultrasonic sensor and a first driving circuit; the ultrasonic sensor includes a first electrode, a second electrode, and a dielectric layer between the first electrode and the second electrode, the first driving circuit is configured to drive the ultrasonic sensor such that the ultrasonic signal detection circuit outputs a detection signal according to a driving signal provided by the first driving circuit and an ultrasonic echo signal received by the ultrasonic sensor; each of the plurality of reference circuits includes a reference transceiver and a second driving circuit, the reference transceiver includes a third electrode, a fourth electrode, and a dielectric layer between the third electrode and the fourth electrode; the second driving circuit is configured to drive the reference transceiver such that the reference circuit outputs a reference signal according to a driving signal provided by the second driving circuit; the dielectric layer of the ultrasonic sensor is made of a polarized piezoelectric material and has piezoelectric sensitivity; and the dielectric layer of the reference transceiver is made of an un-polarized piezoelectric material but does not have the piezoelectric sensitivity.

In some embodiments of the present disclosure, the plurality of ultrasonic signal detection circuits and the plurality of reference circuits are arranged in an array, the plurality of ultrasonic signal detection circuits are arranged in M rows and N columns, and the plurality of reference circuits are arranged in M rows and L columns; where M and N are positive integers greater than 1, L is a positive integer not less than 1, and i is a positive integer not less than 1 and less than and equal to M.

In some embodiments of the present disclosure, the touch panel further includes a plurality of scan lines, a plurality of signal lines, and a plurality of driving lines, wherein the plurality of scan lines are configured to provide an output control signal, reference circuits in a row and ultrasonic signal detection circuits in the same row as the reference circuits share a same scan line; reference circuits in a row and ultrasonic signal detection circuits in the same row as the reference circuits share a same driving line; reference circuits in a same column share a same signal line, and ultrasonic signal detection circuits in a same column share a same signal line; the third electrode of the reference transceiver is electrically connected to a corresponding driving line, the fourth electrode of the reference transceiver is electrically connected to a driving control terminal of the second driving circuit, an output control terminal of the second driving circuit is electrically connected to a corresponding scan line, an input terminal of the second driving circuit is electrically connected to a high-level signal terminal, an output terminal of the second driving circuit is electrically connected to a corresponding signal line, and the input terminal of the second driving circuit and the output terminal of the second driving circuit are conducted when the output control terminal of the second driving circuit receives the output control signal, and the reference circuit outputs the reference signal according to a driving signal provided by the driving line; the first electrode of the ultrasonic sensor is electrically connected to a corresponding driving line, the second electrode of the ultrasonic sensor is electrically connected to a driving control terminal of the first driving circuit, an output control terminal of the first driving circuit is electrically connected to a corresponding scan line, an input terminal of the first driving circuit is electrically connected to the high-level signal terminal, an output terminal of the first driving circuit is electrically connected to a corresponding signal line, and the input terminal of the first driving circuit and the output terminal of the first driving circuit are conducted when the output control terminal of the first driving circuit receives the output control signal, and the ultrasonic signal detection circuit outputs the detection signal according to the driving signal provided by the driving line and received ultrasonic echo signals.

In some embodiments of the present disclosure, the first driving circuit includes a first switch sub-circuit, a first output sub-circuit, a first protection sub-circuit, and a bias voltage input terminal, a control terminal of the first switch sub-circuit is the driving control terminal of the first driving circuit, and the second electrode of the ultrasonic sensor is electrically connected to the control terminal of the first switch sub-circuit; an input terminal of the first switch sub-circuit is the input terminal of the first driving circuit, an output terminal of the first switch sub-circuit is electrically connected to an input terminal of the first output sub-circuit, and a current output by the output terminal of the first switch sub-circuit is related to a voltage received by the control terminal of the first switch sub-circuit; a control terminal of the first output sub-circuit is electrically connected to the scan line corresponding to the ultrasonic signal detection circuit, and when the control terminal of the first output sub-circuit receives the output control signal, the input terminal of the first output sub-circuit and the output terminal of the first output sub-circuit are conducted, so as to output the current output from the output terminal of the first switch sub-circuit to the input terminal of the first output sub-circuit; an input of the first protection sub-circuit is electrically connected to the bias voltage input terminal, a first terminal of the first protection sub-circuit is electrically connected to a low-level signal terminal, a second terminal of the first protection sub-circuit is electrically connected to a power supply voltage terminal, an output terminal of the first protection sub-circuit is electrically connected to the control terminal of the first switch sub-circuit, the first protection sub-circuit allows a current flowing from the bias voltage input terminal to the output terminal of the first protection sub-circuit to pass therethrough, and cuts off a current flowing from the output terminal of the first protection sub-circuit to the input terminal of the first protection sub-circuit.

In some embodiments of the present disclosure, the first switch sub-circuit includes a first switch transistor, a gate of the first switch transistor is the control terminal of the first switch sub-circuit and is electrically connected to the second electrode of the ultrasonic sensor, a first electrode of the first switch transistor is the input terminal of the first switch sub-circuit and is electrically connected to the high-level signal terminal, and a second electrode of the first switch transistor is the output terminal of the first switch sub-circuit and is electrically connected to the input terminal of the first output sub-circuit.

In some embodiments of the present disclosure, the first output sub-circuit includes a first output transistor, a gate of the first output transistor is the control terminal of the first output sub-circuit and is electrically connected to a corresponding gate line, a first electrode of the first output transistor is the input terminal of the first output sub-circuit and is electrically connected to the output terminal of the first switch sub-circuit, and a second electrode of the first output transistor is the output terminal of the first output sub-circuit.

In some embodiments of the present disclosure, the first protection sub-circuit includes a first unidirectional sub-unit and a first clamping sub-unit; a first terminal of the first unidirectional sub-unit is the output terminal of the first protection sub-circuit, the first unidirectional sub-unit allows a current flowing from a second terminal of the first unidirectional sub-unit to the first terminal of the first unidirectional sub-unit to pass therethrough, and the first unidirectional sub-unit cuts off a current flowing from the first terminal of the first unidirectional sub-unit to the second terminal of the first unidirectional sub-unit, and the second terminal of the first unidirectional sub-unit is the input terminal of the first protection sub-circuit and is electrically connected to the bias voltage input terminal; a first terminal of the first clamping sub-unit is electrically connected to the low-level signal terminal, a second terminal of the first clamping sub-unit is electrically connected to the power supply voltage terminal, the bias voltage input terminal is electrically connected to an output terminal of the first clamping sub-unit, the first clamping sub-unit allows a current to flow from the first terminal of the first clamping sub-unit to the second terminal of the first clamping sub-unit, and the first clamping sub-unit is capable of cutting off a current flowing from the second terminal of the first clamping sub-unit to the first terminal of the first clamping sub-unit, the first clamping sub-unit is configured to limit a voltage at the bias voltage input terminal between a voltage input from the low-level signal terminal and a voltage input from the power supply voltage terminal.

In some embodiments of the present disclosure, the first unidirectional sub-unit includes a first diode, an anode of the first diode is the second terminal of the first unidirectional sub-unit and is electrically connected to the bias voltage input terminal, and a cathode of the first diode is the first terminal of the first unidirectional sub-unit and is electrically connected to the control terminal of the first switch sub-circuit.

In some embodiments of the present disclosure, the first clamping sub-unit includes a second diode unit and a third diode unit in series, the bias voltage input terminal is electrically connected at a series point of the second diode unit and the third diode unit, the second diode unit includes a second diode, an anode of the second diode is the first terminal of the first clamping sub-unit and is electrically connected to the low-level signal terminal, the third diode unit includes a third diode, an anode of the third diode is connected to the cathode of the second diode, and a cathode of the third diode is the second terminal of the first clamping sub-unit and is electrically connected to the power supply voltage terminal; or the second diode unit includes a plurality of second diodes in series, the third diode unit includes a plurality of third diodes in series, an anode of the second diode at a start position is the first terminal of the first clamping sub-unit and is electrically connected to the low-level signal terminal, a cathode of the second diode at an end position is electrically connected to an anode of the third diode at a start position, and a cathode of the third diode at an end position is the second terminal of the first clamping sub-unit and is electrically connected to the power supply voltage terminal.

In some embodiments of the present disclosure, the touch panel further includes a plurality of reset lines, one of which corresponds to each row of the ultrasonic signal detection circuits, and the ultrasonic signal detection circuits and the reference circuits in a same row share a same reset line; the first driving circuit further includes a first reset sub-circuit, a control terminal of the first reset sub-circuit is electrically connected to a reset line, an output terminal of the first reset sub-circuit is electrically connected to the control terminal of the first switch sub-circuit, an input terminal of the first reset sub-circuit is electrically connected to the bias voltage input terminal, and the input terminal of the first reset sub-circuit and the output terminal of the first reset sub-circuit are configured to be conducted when the control terminal of the first reset sub-circuit receives a reset signal.

In some embodiments of the present disclosure, the first reset sub-circuit includes a first reset transistor, a gate of the first reset transistor is the control terminal of the first reset sub-circuit and is electrically connected to a corresponding reset line, a first electrode of the first reset transistor is the input terminal of the first reset sub-circuit and is electrically connected to the bias voltage input terminal, and a second electrode of the first reset sub-circuit is the output terminal of the first reset sub-circuit and is electrically connected to the control terminal of the first switch sub-circuit.

In some embodiments of the present disclosure, the ultrasonic signal detection circuit further includes a voltage input terminal electrically connected to an anode of a first one of the one or more second diodes of the second diode unit of the first protection sub-circuit.

In some embodiments of the present disclosure, the second driving circuit includes a second switch sub-circuit, a second reset sub-circuit, a bias voltage input terminal, a control terminal of the second switch sub-circuit is the driving control terminal of the second driving circuit, and the fourth electrode of the reference transceiver is electrically connected to the control terminal of the second switch sub-circuit; a control terminal of the second reset sub-circuit is electrically connected to the reset line, an output terminal of the second reset sub-circuit is electrically connected to the control terminal of the second switch sub-circuit, an input terminal of the second reset sub-circuit is electrically connected to the bias voltage input terminal, and the input terminal of the second reset sub-circuit and the output terminal of the second reset sub-circuit are configured to be conducted when the control terminal of the second reset sub-circuit receives the reset signal; wherein the second reset sub-circuit includes a second reset transistor, a gate of the second reset transistor is the control terminal of the second reset sub-circuit and is electrically connected to a corresponding reset line, a first electrode of the second reset transistor is the input terminal of the second reset sub-circuit and is electrically connected to the bias voltage input terminal, and a second electrode of the second reset sub-circuit is the output terminal of the second reset sub-circuit and is electrically connected to a control terminal of the second switch sub-circuit.

In some embodiments of the present disclosure, N>L, and 1<L<5.

In a second aspect of the present disclosure, the present disclosure provides a touch recognition method for a touch panel, wherein the touch panel is the touch panel according to any of embodiments of the first aspect, the touch recognition method includes an ultrasonic emission stage and a recognition stage, wherein, in the ultrasonic emission stage, the touch recognition method includes a step of: controlling the ultrasonic sensors of all the ultrasonic signal detection circuits to generate ultrasonic waves; and in the recognition stage, the touch recognition method includes steps of: controlling the $i^{th}$ row of ultrasonic signal detection circuits to output detection signals, and controlling the $i^{th}$ row of reference circuits to output reference signals, wherein i is a variable and is sequentially taken from 1 to M; determining signal quantity of reflected echoes received by the $i^{th}$ row of ultrasonic signal detection circuits according to the detection signals output by the $i^{th}$ row of ultrasonic signal detection circuits and the reference signals output by the $i^{th}$ row of reference circuits; determining feature information of a touch point according to the signal quantity of the reflected echoes received by the $i^{th}$ row of ultrasonic signal detection circuits.

In some embodiments of the present disclosure, the feature information of the touch point includes a position of the touch point and/or a fingerprint topography at the touch point.

In some embodiments of the present disclosure, the step of determining signal quantity of reflected echoes received by the $i^{th}$ row of ultrasonic signal detection circuits according to the detection signals output by the $i^{th}$ row of ultrasonic signal detection circuits and the reference signals output by the $i^{th}$ row of reference circuits includes steps of: acquiring the signal quantities of the detection signals output by all ultrasonic signal detection circuits in the $i^{th}$ row; acquiring the signal quantities of the reference signals output by all reference circuits in the $i^{th}$ row; determining an average value of the signal quantities of the reference signals output from all reference circuits in the $i^{th}$ row; subtracting the average value in the $i^{th}$ row from the signal quantity of the detection signal output by each ultrasonic signal detection circuit in the $i^{th}$ row, so as to obtain the signal quantity of the reflected echoes received by each ultrasonic signal detection circuit in the $i^{th}$ row.

In some embodiments of the present disclosure, the touch recognition method further includes a reset step, and a bias voltage supplying step between the ultrasonic emission stage and the recognition stage, the reset step includes: resetting the $i^{th}$ row of the ultrasonic signal detection circuits and the $i^{th}$ row of the reference circuits, after the feature information of the touch point is determined according to the signal quantity of the reflected echoes received by the $i^{th}$ row of the ultrasonic signal detection circuits, the bias voltage supplying step includes: providing a high-level signal to the second electrode of the ultrasonic sensor through the bias voltage input terminal.

In a third aspect of the present disclosure, the present disclosure provides a touch device including a touch panel and a touch driving circuit configured to drive the touch panel, wherein the touch panel is the touch panel according to any of embodiments of the first aspect, the touch driving circuit includes: an ultrasonic driving sub-circuit configured to control the ultrasonic sensors of all the ultrasonic signal detection circuits to generate ultrasonic waves; a row driving sub-circuit configured to sequentially control the 1st to Mth rows of the ultrasonic signal detection circuits to output detection signals, and control the 1st to Mth rows of the reference circuits to output reference signals; a signal quantity determination sub-circuit configured to determine signal quantity of the reflected echoes received by the $i^{th}$ row of ultrasonic signal detection circuits according to the detection signals output by the $i^{th}$ row of ultrasonic signal detection circuits and the reference signals output by the $i^{th}$ row of reference circuits, wherein i is a variable and is sequentially taken from 1 to M; a feature information determination sub-circuit configured to determine feature information of a touch point according to the signal quantity of the reflected echoes received by the $i^{th}$ row of ultrasonic signal detection circuits.

In some embodiments of the present disclosure, the feature information of the touch point includes a position of the touch point and/or a fingerprint topography at the touch point, and the feature information determination sub-circuit is configured to determine the position of the touch point and/or the fingerprint topography at the touch point according to the signal quantity of the reflected echoes received by the $i^{th}$ row of ultrasonic signal detection circuits, wherein the signal quantity determination sub-circuit includes: a signal quantity acquisition unit configured to acquire the signal quantities of the detection signals output by all ultrasonic signal detection circuits in the $i^{th}$ row and acquire the signal quantities of the reference signals output by all reference circuits in the $i^{th}$ row; an average value calculation unit configured to determine an average value of the signal quantities of the reference signals output from all reference circuits in the $i^{th}$ row; an ultrasonic echo signal quantity determination unit configured to subtract the average value in the $i^{th}$ row from the signal quantity of the detection signal output by each ultrasonic signal detection circuit in the $i^{th}$ row, so as to obtain the signal quantity of the reflected echoes received by each ultrasonic signal detection circuit in the $i^{th}$ row.

BRIEF DESCRIPTION OF DRAWINGS

The accompanying drawings, which are included to provide a further understanding of the present disclosure and constitute a part of this specification, are for the purpose of explaining the present disclosure together with the following exemplary embodiments, but are not intended to limit the present disclosure. In the drawings.

DETAIL DESCRIPTION OF EMBODIMENTS

Exemplary embodiments of the present disclosure will be described in detail below with reference to the accompanying drawings. It should be understood that the exemplary embodiments described herein are only for illustrating and explaining the present disclosure, but are not for limiting the present disclosure.

In a ultrasonic fingerprint detection circuit including a piezoelectric sensor made of PVDF, a high-voltage high-frequency signal is needed to drive the piezoelectric material to emit ultrasonic waves, during which a large amount of noise is easily generated, and the phenomenon of random jitter of a received signal may occur, so that the detection performance and the stability of the system are adversely influenced.

Figure 1:
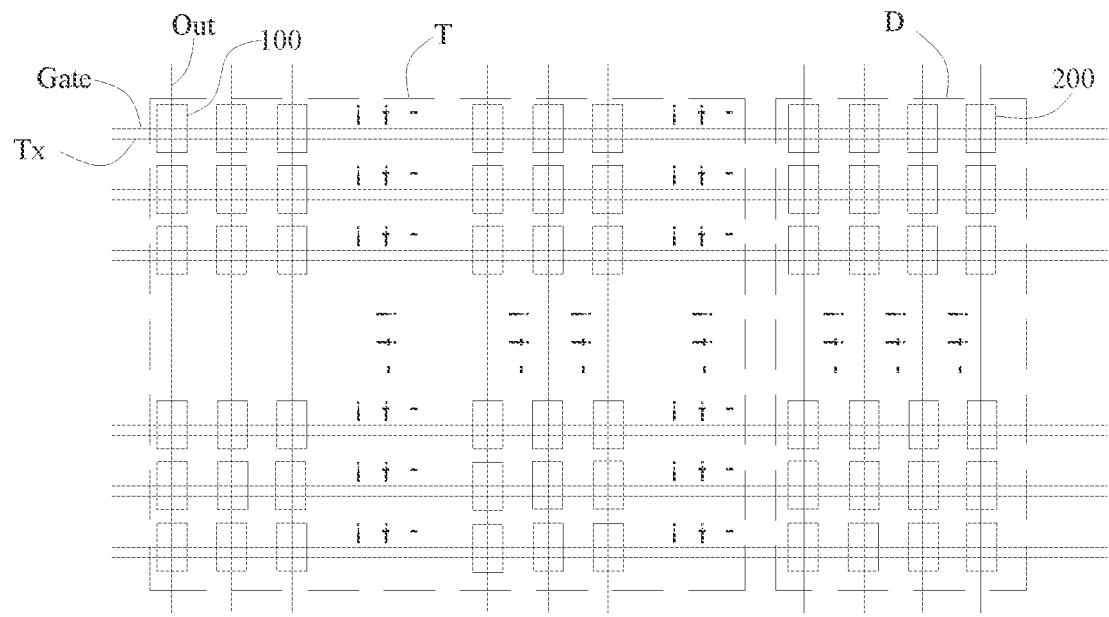
FIG. 1 is a schematic diagram of an embodiment of a touch panel according to the present disclosure.
Figure 2:
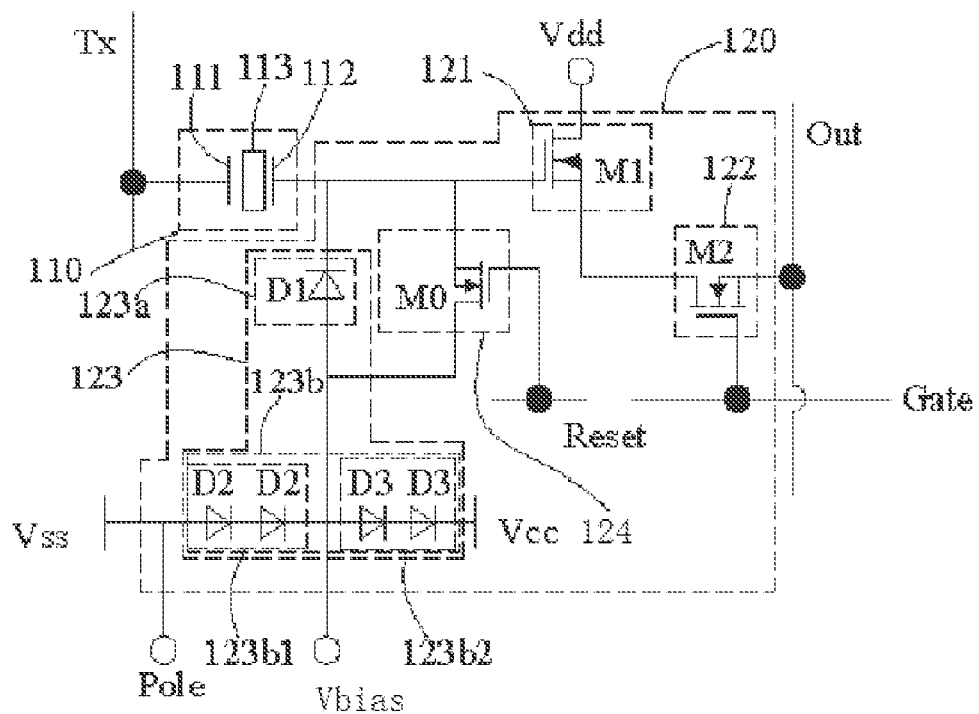
FIG. 2 is a schematic diagram of an embodiment of an ultrasonic signal detection circuit.
Figure 3:
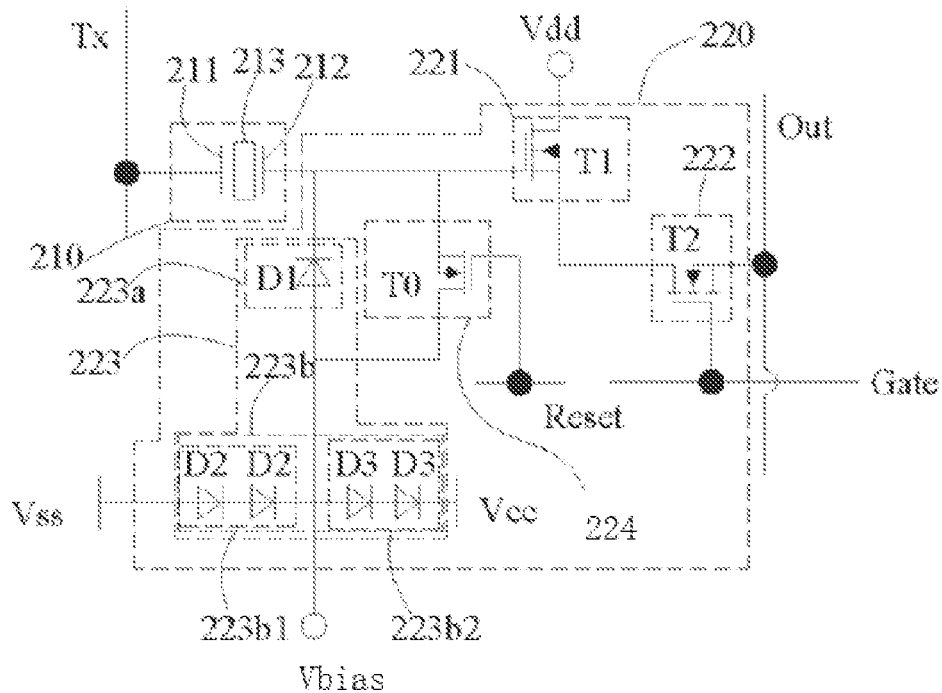
FIG. 3 is a schematic diagram of an embodiment of a reference circuit.

FIG. 1 is a schematic diagram of an embodiment of a touch panel according to the present disclosure. FIG. 2 is a schematic diagram of an embodiment of an ultrasonic signal detection circuit. FIG. 3 is a schematic diagram of an embodiment of a reference circuit.

As a first aspect of the present disclosure, a touch panel is provided. As shown in FIG. 1, the touch panel includes a touch region T and a reference region D, the touch region T includes a plurality of ultrasonic signal detection circuits (s) 100 arranged in M rows and N columns, and the reference region D includes a plurality of reference circuits 200 arranged in M rows and L columns. In the embodiment of the present disclosure, the number of rows of the ultrasonic signal detection circuits 100 and the number of rows of the reference circuits 200 may be equal to each other or may not be equal to each other. Similarly, the number of columns of the ultrasonic signal detection circuits 100 and the number of columns of the reference circuits 200 may be equal to each other or may not be equal to each other. In the embodiment of the present disclosure, the number of rows of the ultrasonic signal detection circuits 100 is equal to the number of rows of the reference circuits 200, and the number of columns of the reference circuits 200 is as large as possible.

As shown in FIG. 2, each ultrasonic signal detection circuit 100 includes an ultrasonic transceiver (ultrasonic sensor) 110 and a first driving circuit 120. The ultrasonic transceiver 110 may be configured to emit an ultrasonic wave upon receiving a predetermined electric signal, and the ultrasonic transceiver 110 may be further configured to receive the ultrasonic wave and generate an electric signal according to the received ultrasonic wave. The first driving circuit 120 may be configured to drive the ultrasonic transceiver 110 such that the ultrasonic signal detection circuit 100 outputs a detection signal according to a driving signal provided by the first driving circuit 120 and the ultrasonic wave received by the ultrasonic transceiver 110.

As shown in FIG. 3, each reference circuit 200 includes a reference transceiver 210 and a second driving circuit 220. The second driving circuit 220 may be configured to drive the reference transceiver 210 such that the reference circuit outputs a reference signal according to a driving signal provided by the second driving circuit.

In the present disclosure, the structure of each reference transceiver 210 is the same as the structure of each ultrasonic transceiver 110. Specifically, the reference transceiver 210 includes a plurality of components, as does the ultrasonic transceiver 110. The reference transceiver 210 and the ultrasonic transceiver 110 have the same number of components. A relative positional relationship between the components of the reference transceiver 210 is the same as that between the components of the ultrasonic transceiver 110, and sizes of respective components of the reference transceiver 210 are the same as those of the ultrasonic transceiver 110. For example, one component of the ultrasonic transceiver 110 is a dielectric layer 113 made of a piezoelectric material. Similarly, the dielectric layer 213 of the reference transceiver 210 is also made of the piezoelectric material before polarizing (i.e. unpolarized piezoelectric material). One component of the ultrasonic transceiver 110 is a first electrode 111 made of an electrode material. Similarly, a third electrode 211 of the reference transceiver 210 is also made of the electrode material. One component of the ultrasonic transceiver 110 is a second electrode 112 made of the electrode material. Similarly, a fourth electrode 212 of the reference transceiver 210 is also made of the electrode material. Therefore, the structure of the ultrasonic transceiver 110 is the same as that of the reference transceiver 210. The $i^{th}$ row of ultrasonic signal detection circuits 100 in the touch region T and the $i^{th}$ row of reference circuits 200 in the reference region D are located in a same row. Note that, in the present disclosure, M, N are all positive integers greater than 1, L is a positive integer not less than 1, and i is a positive integer not less than 1 and equal to or less than M.

In the embodiment of the present disclosure, in an ultrasonic wave transmitting stage for the touch panel, after the touch panel is powered on, the ultrasonic transceivers 110 of respective ultrasonic signal detection circuits 100 of the touch panel transmit the ultrasonic waves, and the reference transceivers in the reference circuits 200 cannot transmit the ultrasonic waves.

In the embodiment of the present disclosure, in an ultrasonic wave receiving stage for the touch panel, when a finger of an operator touches the touch region T of the touch panel, the finger of the operator covers the plurality of ultrasonic signal detection circuits 100, and the ultrasonic waves emitted from the ultrasonic transceivers 110 of the covered ultrasonic signal detection circuits 100 are reflected by the finger back to the touch region T of the touch panel, and are received by the ultrasonic transceivers 110 of the ultrasonic signal detection circuits 100 covered by the finger.

In the embodiment of the present disclosure, in a fingerprint recognition stage for the touch panel, after receiving the ultrasonic wave, the ultrasonic transceiver 110 of the ultrasonic signal detection circuit 100 will output an induced current according to the intensity of the received ultrasonic wave. Because the fingerprint has ridges and valleys, propagation paths for the ultrasonic waves have different lengths, and the time for the reflected ultrasonic waves to the ultrasonic signal detection circuits 100 are different, so that echo signal quantities are also different, and the fingerprint may be restored by analyzing the echo signal quantities. Since the plurality of ultrasonic signal detection circuits 100 are arranged in a plurality of rows and a plurality of columns, a position of each ultrasonic signal detection circuit 100 may be uniquely determined according to the number of row and the number of column of the ultrasonic signal detection circuit 100.

In the present disclosure, coordinates of touch points may be determined by determining coordinates of the ultrasonic signal detection circuits 100 (i.e., the number of rows and the number of columns of the ultrasonic signal detection circuits) that outputs the induced current.

The induced current output by the ultrasonic signal detection circuit 100 includes following three factors: 1. a distance between an object (e.g., a finger) that reflects ultrasonic waves and the ultrasonic signal detection circuit 100; 2. system characteristics (including system noise, random jitter noise, noise due to device variation); 3. a bias voltage applied to an ultrasonic capacitive element.

When the touch panel receives a signal, system characteristics are important factors affecting touch accuracy. In the present disclosure, the touch panel is further provided with the reference region D. The reference circuits 200 are provided in the reference region D, and the reference circuit 200 has the same functions as the ultrasonic signal detection circuit 100 except that it does not have a function of receiving and transmitting ultrasonic waves. In a same row, voltages applied to respective elements of the reference circuit 200 are also the same as respective voltages applied to respective elements of the ultrasonic signal detection circuit 100. That is, signals output by the reference circuit 200 are also affected by the system characteristics, and the influence of the random jitter on the reference circuit 200 is the same as the influence of the random jitter on the ultrasonic signal detection circuit 100. Since the reference circuit 200 does not have a function of receiving and transmitting ultrasonic waves, the signals output by the reference circuit 200 differs from the signals output by the ultrasonic signal detection circuit 100 only in the transmitted ultrasonic waves and the reflected ultrasonic waves. Therefore, when analyzing the signals output by the ultrasonic signal detection circuit 100, subtracting the signals output by the reference circuit 200 located on the same row as the ultrasonic signal detection circuit 100 from the signals output by the ultrasonic signal detection circuit 100 is equivalent to eliminating the influence caused by the system characteristics, so that position information of the touch points and other information (e.g., fingerprint information, etc.) related to touch may be determined more accurately.

Figure 5:
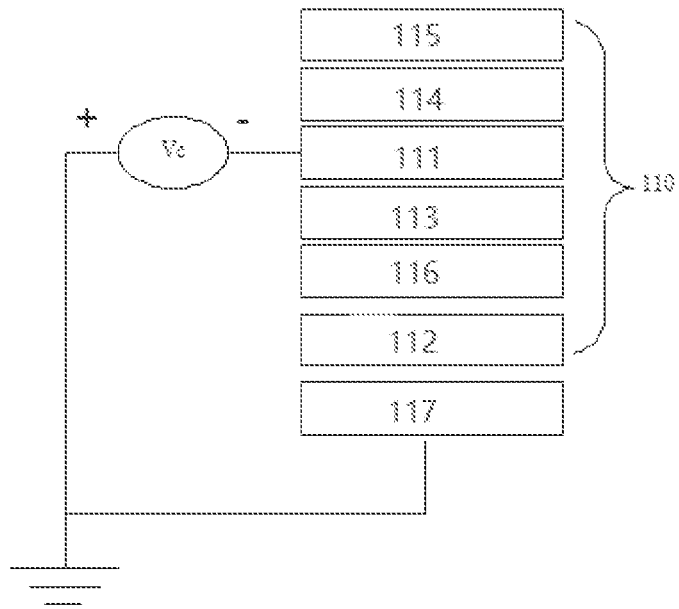
FIG. 5 is a circuit diagram for polarizing a dielectric layer.

FIG. 5 is a circuit diagram for polarizing a dielectric layer. One embodiment of an ultrasonic transceiver 110 is shown in FIG. 5. In this embodiment, the ultrasonic transceiver 110 is a capacitive element. In FIG. 5, the first electrode 111 of the ultrasonic transceiver, the dielectric layer 113 of the ultrasonic capacitive element, and the second electrode 112 of the ultrasonic capacitive element are shown. The dielectric layer 113 is between the first electrode 111 and the second electrode 112. In addition to the first electrode 111, the second electrode 112, and the dielectric layer 113, the ultrasonic transceiver 110 may further include a silver coating layer 114 disposed on a side of the first electrode 111 distal to the dielectric layer 113, and an auxiliary dielectric material layer 115 disposed on a side of the silver coating layer 114 distal to the first electrode 111. Optionally, a protective layer 116 may also be disposed between the dielectric layer 113 and the second electrode 112. In an embodiment of the present disclosure, a glass plate 117 is further provided on a side of the second electrode 112 distal to the protective layer 116.

In the present disclosure, the silver coating layer 114 is configured to form a parallel circuit with the first electrode 111, reducing the overall resistance of the ultrasonic signal detection circuit 100. The auxiliary dielectric material layer 115 is provided to increase the capacitance of the ultrasonic transceiver 110, thereby increasing the quantity of echo signals. The protective layer 116 is disposed between the dielectric layer 113 and the second electrode 112 to protect the second electrode 112 and prevent the second electrode 112 from being damaged during the process of manufacturing the dielectric layer 113.

As an alternative embodiment, the first electrode 111 may be made of a conductive Titanium Aluminum Titanium (TAT) material, and the second electrode 112 may be made of a transparent electrode material (e.g., Indium Tin Oxide (ITO)). In the present disclosure, the protective layer (insulating layer) 116 may also be made of graphite or an oxidized resin. In the present disclosure, a thickness of the dielectric layer 113 is not particularly limited. As an alternative embodiment, the thickness of the dielectric layer 113 may be between 5 µm and 12 µm. Optionally, the thickness of the dielectric layer 113 is 9 µm.

Hereinafter, using the touch panel to perform touch recognition will be detailed described, which is not described herein again.

In the present disclosure, a specific application scenario of the touch panel is not particularly limited. As an alternative embodiment, the touch panel may be used for fingerprint recognition.

Figure 4:
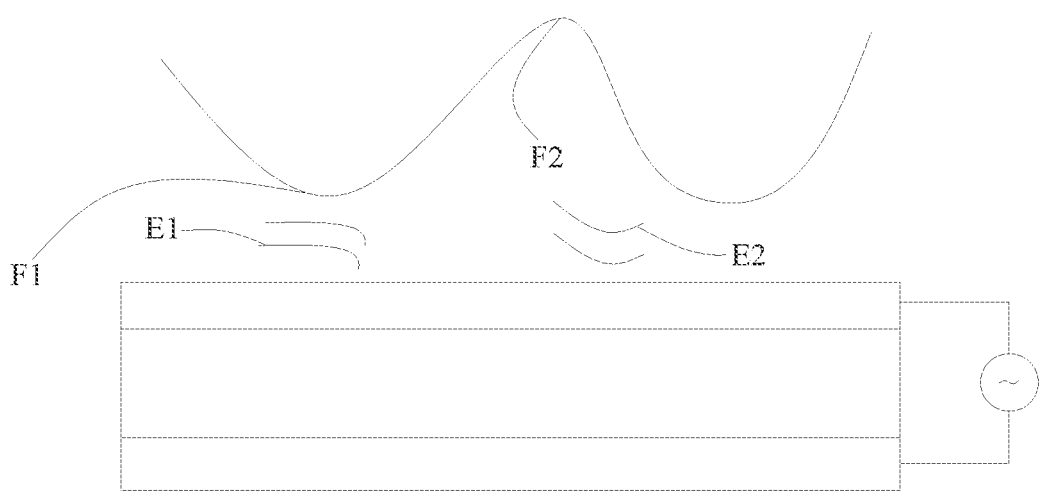
FIG. 4 illustrates the principle of the fingerprint recognition.

FIG. 4 illustrates the principle of the fingerprint recognition. As shown in FIG. 4, the human fingerprint includes a convex fingerprint ridge F1 and a concave fingerprint valley F2. When a finger is located above the touch panel, a distance between the fingerprint ridge F1 and a surface of the touch panel is smaller than a distance between the fingerprint valley F2 and the surface of the touch panel.

Therefore, a propagation path of the ultrasonic wave reaching the fingerprint ridge F1 and then reflected back to the touch panel by the fingerprint ridge F1 has a length smaller than that of a propagation path of the ultrasonic wave reaching the fingerprint valley F2 and then reflected back to the touch panel by the fingerprint valley F2. Therefore, the time of reflecting the echo back to the touch panel by the fingerprint ridge F1 is different from the time of reflecting the echo back to the touch panel by the fingerprint valley F2, which also causes a difference between the echo quantity reflected by the fingerprint ridge and the echo quantity reflected by the fingerprint valley. The fingerprint morphology of the finger covering the touch panel may be restored by analyzing the difference between the signal quantities.

A difference between the heights of the fingerprint ridge F1 and the fingerprint valley F2 is very small, in the present disclosure, since the touch panel is provided with the reference circuits 200, the influence caused by the system characteristics is reduced or even eliminated when analyzing the quantity of signals output by the ultrasonic signal detection circuits 100, so that the quantity of ultrasonic echo reflected by the fingerprint ridge F1 and the quantity of ultrasonic echo reflected by the fingerprint valley F2 may be distinguished from each other, and the fingerprint morphology may be determined more accurately.

In the present disclosure, it is particularly limited to determine the row number and column number of the ultrasonic signal detection circuit 100 that outputs the induced current in the touch panel, and to determine the row number and column number of the reference circuit 200 that outputs a reference signal.

As an alternative embodiment, each column of ultrasonic signal detection circuits is provided with corresponding signal detection elements, and each column of reference circuits is provided with corresponding signal detection elements. The ultrasonic signal detection circuits 100 and the reference circuits 200 may be driven row by row. When performing the touch recognition (including determining coordinates of touch points and recognizing the fingerprint morphology), signals output by each column of ultrasonic signal detection circuits 100 and signals output by each column of the reference circuit 200 are detected. The number of a row of an ultrasonic signal detection circuit that outputs an induced current may be determined by the timing at which the induced current is detected, and the number of a column of the ultrasonic signal detection circuit may be determined by a position of the signal detection element that detects the induced current. Likewise, the number of a row of a reference circuit that outputs a reference signal may be determined by the timing at which the reference signal is detected, and the number of a column of the reference circuit 200 that outputs the reference signal may be determined by a position of the signal detection element that detects the reference signal.

In the present disclosure, when the $i^{th}$ row of ultrasonic signal detection circuits 100 is driven, the $i^{th}$ row of reference circuits 200 is also driven, and the coordinates of the touch points may be determined by analyzing the timing of outputting signals from the reference regions and the number of columns.

For convenience of control, optionally, as shown in FIG. 1, the touch panel includes a plurality of scan lines Gate configured to provide an output control signal, a plurality of signal lines Out, and a plurality of driving lines Tx.

The reference circuits 200 and the ultrasonic signal detection circuits 100 located in the same row as the reference circuits 200 share a same scan line. In other words, the $i^{th}$ row of the reference circuits 200 and the $i^{th}$ row of the ultrasonic signal detection circuits 100 share the $i^{th}$ scan line. The reference circuits 200 and the ultrasonic signal detection circuits 100 located in the same row as the reference circuits 200 share a same driving line Tx. In other words, the $i^{th}$ row of the reference circuits 200 and the $i^{th}$ row of the ultrasonic signal detection circuits 100 share the $i^{th}$ driving line Tx.

The reference circuits 200 located in the same column share a same signal line Out, and the ultrasonic signal detection circuits 100 located in the same column share a same signal line Out.

As shown in FIG. 3, an output control terminal of the second driving circuit 220 is electrically connected to a corresponding scan line Gate, an input terminal of the second driving circuit 220 is electrically connected to a high-level signal terminal Vdd, and an output terminal of the second driving circuit 220 is electrically connected to a corresponding signal line Out. The third electrode 211 of the reference transceiver 210 of the reference circuit 200 is electrically connected to a corresponding driving line Tx, and the fourth electrode of the reference transceiver 210 is electrically connected to a driving control terminal of the second driving circuit 220. Correspondingly, the reference transceiver 210 further includes the fourth electrode 212 and the dielectric layer 213. The dielectric layer 213 is between the third electrode 211 and the fourth electrode 212.

The input terminal of the second driving circuit 220 and the output terminal of the second driving circuit 220 are conducted (the input terminal of the second driving circuit 220 is electrically connected to the output terminal of the second driving circuit 220 such that a current flows through the input terminal and the output terminal of the second driving circuit 220) when the output control terminal of the second driving circuit 220 receives the output control signal, and the reference circuit outputs the reference signal according to a driving signal provided by the driving line Tx. It should be noted that the reference signal is a signal related to the system characteristics of the touch panel.

As shown in FIG. 2, an output control terminal of the first driving circuit 120 of the ultrasonic signal detection circuit 100 is electrically connected to a corresponding scan line Gate, an input terminal of the first driving circuit 120 of the ultrasonic signal detection circuit 100 is electrically connected to the high-level signal terminal Vdd, the first electrode 111 of the ultrasonic transceiver 110 is electrically connected to the driving line Tx, the second electrode 112 of the ultrasonic transceiver 110 is electrically connected to a driving control terminal of the first driving circuit 120, and an output terminal of the first driving circuit 120 is electrically connected to a corresponding signal line Out. The input terminal of the first driving circuit 120 and the output terminal of the first driving circuit 120 are conducted when the output control terminal of the first driving circuit 120 receives the output control signal, and the ultrasonic signal detection circuit outputs the detection signal according to the driving signal provided by the driving line Tx and the received ultrasonic echo signal.

Since the first electrode 111 of the ultrasonic transceiver 110 is electrically connected to the driving line Tx, the ultrasonic transceiver 110 generates an ultrasonic signal upon excitation of the driving signal. Also, when the ultrasonic transceiver 110 receives the ultrasonic signal reflected back to the ultrasonic transceiver 110, the current output from the second electrode 112 of the ultrasonic transceiver 110 changes with the quantity of the ultrasonic signal. A magnitude of the output signal of the first driving circuit 120 is related to the quantity of the ultrasonic echo signal received by the ultrasonic transceiver 110, so that the feature information of the touch points may be determined by analyzing the sensing signal output by the first driving circuit 120.

In the present disclosure, the specific structure of the first driving circuit 120 of the ultrasonic signal detection circuit 100 is not particularly limited. For example, in the embodiment shown in FIG. 2, the first driving circuit 120 of the ultrasonic signal detection circuit 100 includes a first switch sub-circuit 121, a first output sub-circuit 122, a first negative-voltage prevention sub-circuit (first protection sub-circuit) 123, and a bias voltage input terminal Vbias.

A control terminal of the first switch sub-circuit 121 is formed as the driving control terminal of the first driving circuit 120, and the second electrode 112 of the ultrasonic transceiver 110 is electrically connected to a control terminal of the first switch sub-circuit 121.

An input terminal of the first switch sub-circuit 121 is formed as the input terminal of the first driving circuit 120, an output terminal of the first switch sub-circuit 121 is electrically connected to an input terminal of the first output sub-circuit 122, and a current output by the output terminal of the first switch sub-circuit 121 is correlated to a voltage received by the control terminal of the first switch sub-circuit 121. The voltage at the control terminal of the first switch sub-circuit 121 is correlated to the quantity of the ultrasonic echo signal received by the ultrasonic transceiver 110. Therefore, a magnitude of the current output by the first switch sub-circuit 121 is also correlated to the quantity of the ultrasonic echo signal received by the ultrasonic transceiver 110.

A control terminal of the first output sub-circuit 122 is electrically connected to the scan line Gate corresponding to the ultrasonic signal detection circuit 100. When the control terminal of the first output sub-circuit 122 receives the output control signal provided by the scan line Gate, the input terminal of the first output sub-circuit 122 and the output terminal of the first output sub-circuit 122 are conducted, so as to output the current outputted from the output terminal of the first switch sub-circuit 121 to the input terminal of the first output sub-circuit 122.

An input terminal of the first negative-voltage prevention sub-circuit 123 is electrically connected to the bias voltage input terminal Vbias, a first terminal of the first negative-voltage prevention sub-circuit 123 is electrically connected to a low-level signal terminal Vss, a second terminal of the first negative-voltage prevention sub-circuit 123 is electrically connected to a power supply voltage terminal Vcc, an output terminal of the first negative-voltage prevention sub-circuit 123 is electrically connected to the control terminal of the first switch sub-circuit 121, the first negative-voltage prevention sub-circuit 123 allows a current flowing from the bias voltage input terminal Vbias to the output terminal of the first negative-voltage prevention sub-circuit 123 to pass therethrough, and cuts off a current flowing from the output terminal of the first negative-voltage prevention sub-circuit 123 to the input terminal of the first negative-voltage prevention sub-circuit 123.

The ultrasonic transceiver 110 has not only a function of transmitting ultrasonic waves and outputting a current according to the received ultrasonic waves, but also a function of storing electric power. It should be noted that the signal supplied from the scan line Gate is a pulse signal, and the output control signal is output only in an output period. When the scan line Gate outputs an invalid signal, a voltage at the second electrode of the ultrasonic transceiver 110 is high, and the first negative-voltage prevention sub-circuit 123 is provided to prevent the ultrasonic transceiver 110 from discharging, so as to lock an inductive capacitance generated by the ultrasonic transceiver 110.

In addition, the voltage provided by the power supply voltage terminal Vcc is a positive voltage, and the voltage provided by the low-level signal terminal Vss is a negative voltage, so that the voltage at the bias voltage input terminal Vbias may be prevented from being too large or too small.

In the present disclosure, the specific structure of the first switch sub-circuit 121 is not particularly limited. In the embodiment shown in FIG. 2, the first switch sub-circuit 121 includes a first switch transistor M1, a gate of the first switch transistor M1 serves as the control terminal of the first switch sub-circuit 121 and is electrically connected to the second electrode of the ultrasonic transceiver 110, a first electrode of the first switch transistor M1 serves as the input terminal of the first switch sub-circuit 121 and is electrically connected to the high-level signal terminal Vdd, and a second electrode of the first switch transistor M1 serves as the output terminal of the first switch sub-circuit 121 and is electrically connected to the input terminal of the first output sub-circuit 122.

In the present disclosure, the current output by the second electrode of the first switch transistor M1 is affected by the magnitude of the voltage received by the gate of the first switch transistor M1.

In the present disclosure, the specific structure of the first output sub-circuit 122 is not particularly limited. In the embodiment shown in FIG. 2, the first output sub-circuit 122 includes a first output transistor M2, a gate of the first output transistor M2 is formed as the control terminal of the first output sub-circuit 122 and is electrically connected to the corresponding gate line Gate, a first electrode of the first output transistor M2 is formed as the input terminal of the first output sub-circuit 122 and is electrically connected to the output terminal of the first switch sub-circuit (in the embodiment shown in FIG. 2, the first electrode of the first output transistor M2 is electrically connected to the second electrode of the first switch transistor M1), and a second electrode of the first output transistor M2 is formed as the output terminal of the first output sub-circuit 122.

In the present disclosure, the gate of the first output transistor M2 is electrically connected to the gate line Gate, and the first output transistor M2 functions as a switch transistor. When the gate of the first output transistor M2 receives the output control signal, the first electrode of the first output transistor M2 and the second electrode of the first output transistor M2 are conducted.

In the present disclosure, the structure of the first negative-voltage prevention sub-circuit 123 is also not particularly limited. In the embodiment shown in FIG. 2, the first negative-voltage prevention sub-circuit 123 includes a first unidirectional sub-unit 123a and a first clamping sub-unit 123b.

A first terminal of the first unidirectional sub-unit 123a is formed as the output terminal of the first negative-voltage prevention sub-circuit 123, the first unidirectional sub-unit 123a allows a current flowing from a second terminal of the first unidirectional sub-unit 123a to the first terminal of the first unidirectional sub-unit 123a to pass therethrough, and the first unidirectional sub-unit 123a cuts off a current flowing from the first terminal of the first unidirectional sub-unit 123a to the second terminal of the first unidirectional sub-unit 123a. The second terminal of the first unidirectional sub-unit 123a is formed as the input terminal of the first negative-voltage prevention sub-circuit 123 and is electrically connected to the bias voltage input terminal Vbias.

A first terminal of the first clamping sub-unit 123b is electrically connected to the low-level signal terminal Vss, a second terminal of the first clamping sub-unit 123b is electrically connected to the power supply voltage terminal Vcc, and the bias voltage input terminal Vbias is electrically connected to an output terminal of the first clamping sub-unit 123b. The first clamping sub-unit 123b is configured to limit the voltage at the bias voltage input terminal Vbias between a voltage input from the low-level signal terminal Vss and a voltage input from the power supply voltage terminal Vcc. The first clamping sub-unit 123b allows only a current flowing from the first terminal of the first clamping sub-unit 123b to the second terminal of the first clamping sub-unit 123b to pass therethrough, and the first clamping sub-unit 123b cuts off a current flowing from the second terminal of the first clamping sub-unit 123b to the first terminal of the first clamping sub-unit 123b.

In the present disclosure, the first unidirectional sub-unit 123a functions to stabilize the voltage of the second electrode of the ultrasonic capacitive element and the control terminal of the first switch sub-circuit 121.

In the present disclosure, the first clamping sub-unit 123b functions to prevent the bias voltage input through the bias voltage input terminal Vbias from being excessively large or small.

In the present disclosure, the magnitude of the bias voltage provided by the bias voltage input terminal Vbias is not particularly limited. Optionally, the bias voltage provided by the bias voltage input terminal Vbias is between ±20V. Accordingly, the voltage provided by the low-level signal terminal Vss may be −20V, and the voltage provided by the power supply voltage terminal Vcc may be +20V.

In the present disclosure, the specific structure of the first unidirectional sub-unit 123a is not particularly limited, as long as it has a function of passing current through the first unidirectional sub-unit 123a in one direction. In the embodiment shown in FIG. 2, the first unidirectional sub-unit 123a includes a first diode D1, an anode of the first diode D1 is formed as the second terminal of first unidirectional sub-unit 123a and is electrically connected to the bias voltage input terminal Vbias, and a cathode of the first diode D1 is formed as the first terminal of the first unidirectional sub-unit 123a and is electrically connected to the control terminal of first switch sub-circuit 121.

In the present disclosure, the specific structure of the first clamping sub-unit 123b is not particularly limited, as long as it has a clamping function and maintains the stable voltage input at the bias voltage input terminal Vbias.

Typically, diodes in series may implement the clamping function. In the particular embodiment shown in FIG. 2, the first clamping sub-unit 123b includes a second diode unit 123b1 and a third diode unit 123b2 connected in series. The bias voltage input terminal Vbias is electrically connected at the series point of the second diode unit 123b1 and the third diode unit 123b2.

The second diode unit 123b1 may include one or more second diodes D2, and the third diode unit 123b2 may include one or more third diodes D3.

Specifically, the second diode unit 123b1 may include one second diode D2, the third diode unit 123b2 includes one third diode D3, and the second diode D2 and the third diode D3 are connected in series. An anode of the second diode D2 is formed as the first terminal of the first clamping sub-unit 123b, and is electrically connected to the low-level signal terminal. The third diode unit includes one third diode D3, and an anode of the third diode D3 is electrically connected to a cathode of the second diode D2. A cathode of the third diode D3 is formed as the second terminal of the first clamping sub-unit 123b, and is electrically connected to the power supply voltage terminal Vcc.

Alternatively, the second diode unit 123b1 includes a plurality of second diodes D2 connected in series, and the third diode unit 123b2 includes a plurality of third diodes D3 connected in series. An anode of the second diode D2 at a start position is formed as the first terminal of the first clamping sub-unit 123b and is electrically connected to the low-level signal terminal Vss, and a cathode of the second diode D2 at an end position is electrically connected to an anode of the third diode D3 at a start position. A cathode of the third diode D3 at an end position is formed as the second terminal of the first clamping sub-unit 123b, and is electrically connected to the power supply voltage terminal.

In the particular embodiment shown in FIG. 2, the second diode unit 123b1 includes two second diodes D2 and the third diode unit 123b2 includes two third diodes D3.

Optionally, the first driving circuit 120 of the ultrasonic signal detection circuit 100 may further include a first reset sub-circuit 124, such that the signal output by the first driving circuit 120 of the ultrasonic signal detection circuit 100 is less interfered. Correspondingly, the touch panel further includes a plurality of reset lines, one reset line corresponds to each row of the ultrasonic signal detection circuits 100, and the ultrasonic signal detection circuits 100 and the reference circuits 200 in the same row share a same reset line.

A control terminal of the first reset sub-circuit 124 is configured to be electrically connected to the reset line Reset, an output terminal of the first reset sub-circuit 124 is electrically connected to the control terminal of the first switch sub-circuit 121, and an input terminal of the first reset sub-circuit 124 is electrically connected to the bias voltage input terminal Vbias. The input terminal of the first reset sub-circuit 124 and the output terminal of the first reset sub-circuit 124 are conducted when the control terminal of the first reset sub-circuit 124 receives a reset signal.

In a reset stage, the input terminal and the output terminal of the first reset sub-circuit 124 are conducted, and a reset voltage is input through the bias voltage input terminal Vbias to discharge the control terminal of the first switch sub-circuit 121, so as to prevent residual voltage at the control terminal of the first switch sub-circuit 121 from affecting signals outputted during a next period.

In the present disclosure, the specific structure of the first reset sub-circuit 124 is not particularly limited. For example, in the specific embodiment shown in FIG. 2, the first reset sub-circuit 124 includes a first reset transistor M0, a gate of the first reset transistor M0 is formed as the control terminal of the first reset sub-circuit 124 and is electrically connected to the reset line Reset, a first electrode of the first reset transistor M0 is formed as the input terminal of the first reset sub-circuit 124 and is electrically connected to the bias voltage input terminal Vbias, and a second electrode of the first reset transistor M0 is formed as the output terminal of the first reset sub-circuit 124 and is electrically connected to the control terminal of the first switch sub-circuit 121 (in the embodiment shown in FIG. 2, electrically connected to the gate of the first switch transistor M1).

As described above, the second driving circuit 220 of the reference circuit 200 has a same circuit structure as the first driving circuit 120 of the ultrasonic signal detection circuit 100. Specifically, in the embodiment shown in FIG. 3, the second driving circuit 220 of the reference circuit 200 includes a second switch sub-circuit 221, a second output sub-circuit 222, and a second negative-voltage prevention sub-circuit (second protection sub-circuit) 223. The reference transceiver 210 is a capacitive element.

A control terminal of the second switch sub-circuit 221 is formed as a driving control terminal of the second driving circuit, and the fourth electrode of the reference transceiver 210 is electrically connected to a control terminal of the second switch sub-circuit.

An input terminal of the second switch sub-circuit 221 is formed as the input terminal of the second driving circuit 220, and an output terminal of the second switch sub-circuit 221 is electrically connected to an input terminal of the second output sub-circuit 222.

A control terminal of the second output sub-circuit 222 is electrically connected to the scan line Gate corresponding to the reference circuit 200, and when the control terminal of the second output sub-circuit 222 receives the output control signal provided by the gate line Gate, the input terminal of the second output sub-circuit 222 and an output terminal of the second output sub-circuit 222 are conducted, so as to output a current output from the output terminal of the second switch sub-circuit 221 to the input terminal of the second output sub-circuit 222. Since the reference transceiver 210 of the reference circuit 200 does not have the piezoelectric sensitivity, the current output by the second output sub-circuit 222 is not affected by the touch.

An input terminal of the second negative-voltage prevention sub-circuit 223 is electrically connected to the bias voltage input terminal Vbias, a first terminal of the second negative-voltage prevention sub-circuit 223 is electrically connected to the low-level signal terminal Vss, a second terminal of the second negative-voltage prevention sub-circuit 223 is electrically connected to the power supply voltage terminal Vcc, the output terminal of the second negative-voltage prevention sub-circuit 223 is electrically connected to the control terminal of the second switch sub-circuit 221, the second negative-voltage prevention sub-circuit 223 allows a current flowing from the bias voltage input terminal Vbias to the output terminal of the second negative-voltage prevention sub-circuit 223 to pass therethrough, and cuts off a current flowing from the output terminal of the second negative-voltage prevention sub-circuit 223 to the input terminal of the second negative-voltage prevention sub-circuit (i.e., the bias voltage input terminal Vbias).

In the specific embodiment shown in FIG. 3, the second switch sub-circuit 221 includes a second switch transistor T1, a first electrode of the second switch transistor T1 is formed as the input terminal of the second switch sub-circuit 221 and is electrically connected to the high-level signal terminal Vdd, a second electrode of the second switch transistor T1 is formed as the output terminal of the second switch sub-circuit 221, and a gate of the second switch transistor T1 is formed as the control terminal of the second switch sub-circuit 221 and is electrically connected to the fourth electrode of the reference transceiver 210.

The structure of the second output sub-circuit 222 is the same as that of the first output sub-circuit 122. As shown in FIG. 3, the second output sub-circuit 222 includes a second output transistor T2, and a gate of the second output transistor T2 is formed as the control terminal of the second output sub-circuit 222 and is electrically connected to a corresponding gate line Gate. A first electrode of the second output transistor T2 is formed as the input terminal of the second output sub-circuit 222 and is electrically connected to the output terminal of the second switch sub-circuit (in the specific embodiment shown in FIG. 3, electrically connected to the first electrode of the second switch transistor T1), and a second electrode of the second output transistor T2 is formed as the output terminal of the second output sub-circuit 222.

The second negative-voltage prevention sub-circuit 223 has the same structure as the first negative-voltage prevention sub-circuit 123. The provision of the second negative-voltage prevention sub-circuit 223 may prevent the reference transceiver 210 from discharging at unnecessary times, and lock the capacitance generated by the reference transceiver 210.

In addition, the voltage provided by the power supply voltage terminal Vcc is a positive voltage, and the voltage provided by the low-level signal terminal Vss is a negative voltage, so that the voltage at the bias voltage input terminal Vbias may be prevented from being too large or too small.

In the present disclosure, the specific structure of the second negative-voltage prevention sub-circuit 223 is not particularly limited, but must be the same as that of the first negative-voltage prevention sub-circuit 123. In the embodiment shown in FIG. 3, the second negative-voltage prevention sub-circuit 223 includes a second unidirectional sub-unit 223a and a second clamping sub-unit 223b.

A first terminal of the second unidirectional sub-unit 223a is formed as the output terminal of the second negative-voltage prevention sub-circuit 223, the second unidirectional sub-unit 223a allows a current flowing from a second terminal of the second unidirectional sub-unit 223a to the first terminal of the second unidirectional sub-unit 223a to pass therethrough, and the second unidirectional sub-unit 223a cuts off a current flowing from the first terminal of the second unidirectional sub-unit 223a to the second terminal of the second unidirectional sub-unit 223a. The second terminal of the second unidirectional sub-unit 223a is formed as the input terminal of the second negative-voltage prevention sub-circuit 223 and is electrically connected to the bias voltage input terminal Vbias.

A first terminal of the second clamping sub-unit 223b is electrically connected to the low-level signal terminal Vss, a second terminal of the second clamping sub-unit 223b is electrically connected to the power supply voltage terminal Vcc, and the bias voltage input terminal Vbias is electrically connected to an output terminal of the second clamping sub-unit 223b. The second clamping sub-unit 223b is configured to limit the voltage at the bias voltage input terminal Vbias between a voltage input from the low-level signal terminal Vss and a voltage input from the power supply voltage terminal Vcc. The second clamping sub-unit 223b allows only a current flowing from the first terminal of the second clamping sub-unit 223b to the second terminal of the second clamping sub-unit 223b to pass therethrough, and the second clamping sub-unit 223b cuts off a current flowing from the second terminal of the second clamping sub-unit 223b to the first terminal of the second clamping sub-unit 223b.

Like the first unidirectional sub-unit 123a, in the present disclosure, the second unidirectional sub-unit 223a is configured to stabilize the voltage of the fourth electrode of the reference transceiver 210 and the control terminal of the second switch sub-unit 221.

Like the first clamping sub-unit 123b, in the present disclosure, the second clamping sub-unit 223b functions to prevent the bias voltage input through the bias voltage input terminal Vbias from being excessively large or small.

In the present disclosure, the specific structure of the second unidirectional sub-unit 223a is not particularly limited, as long as it has a function of passing current through the second unidirectional sub-unit 223a. In the embodiment shown in FIG. 3, the second unidirectional sub-unit 223a includes a fourth diode D1, an anode of the fourth diode D1 is formed as the second terminal of the second unidirectional sub-unit 223a, and a cathode of the fourth diode D1 is formed as the first terminal of the second unidirectional sub-unit 223a.

In the present disclosure, the specific structure of the second clamping sub-unit 223b is not particularly limited, but must be the same as that of that of the first clamping sub-unit 123b. The second clamping sub-unit 223b may also have a clamping function and maintain the stable voltage input at the bias voltage input terminal Vbias.

In the particular embodiment shown in FIG. 2, the first clamping sub-unit 123b includes the second diode unit 123b1 and the third diode unit 123b2. Accordingly, in the embodiment shown in FIG. 3, the second clamping sub-unit 223b includes a fourth diode unit 223b1 and a fifth diode unit 223b2. The bias voltage input terminal Vbias is electrically connected between the fourth diode unit 223b1 and the fifth diode unit 223b2.

The fourth diode unit 223b1 may include one or more fourth diodes D2, and the fifth diode unit 223b2 may include one or more fifth diodes D3.

In particular, the fourth diode unit 223b1 may include one fourth diode D2, the fifth diode unit 223b2 includes one fifth diode D3, and the fourth diode D2 and the fifth diode D3 are connected in series. An anode of the fourth diode D2 is formed as the first terminal of the second clamping sub-unit 223b, an anode of the fifth diode D3 is electrically connected to a cathode of the fourth diode D2, and a cathode of the fifth diode D3 is formed as the second terminal of the second clamping sub-unit 223b and is electrically connected to the power supply voltage terminal Vcc.

Alternatively, the fourth diode unit 223b1 includes a plurality of fourth diodes D2 connected in series, and the fifth diode unit 223b2 includes a plurality of fifth diodes D3 connected in series. An anode of the fourth diode D2 at a start position is formed as the first terminal of the second clamping sub-unit 223b and is electrically connected to the low-level signal terminal Vss, a cathode of the fourth diode D2 at an end position is connected in series with an anode of the fifth diode D3 at a start position, and a cathode of the fifth diode D3 at an end position is formed as the second terminal of the second clamping sub-unit and is electrically connected to the power supply voltage terminal Vcc.

In the particular embodiment shown in FIG. 3, the fourth diode sub-unit 223b1 includes two fourth diodes D2, and the fifth diode sub-unit 223b2 includes two fifth diodes D2.

In the embodiment shown in FIG. 2, the first driving circuit 120 of the ultrasonic signal detection circuit 100 further includes the first reset sub-circuit 124. Accordingly, as shown in FIG. 3, the second driving circuit 220 of the reference circuit 200 further includes a second reset sub-circuit 224. A control terminal of the second reset sub-circuit 224 is configured to be electrically connected to the reset line Reset, an output terminal of the second reset sub-circuit 224 is electrically connected to the control terminal of the second switch sub-circuit 221, and an input terminal of the second reset sub-circuit 224 is electrically connected to the bias voltage input terminal Vbias. The input terminal of the second reset sub-circuit 224 and the output terminal of the second reset sub-circuit 224 are conducted when the control terminal of the second reset sub-circuit 224 receives a reset signal.

In the present disclosure, a distinction between the dielectric material of the ultrasonic transceiver 110 and the dielectric material of the reference transceiver 210 is that the dielectric material of the reference transceiver 210 does not have the piezoelectric sensitivity. That is, the dielectric material of the reference transceiver 210 is not polarized, and the dielectric material of reference transceiver 210 cannot generate ultrasonic waves in a case of being driven by a signal as well. However, the dielectric material of the ultrasonic transceiver 110 has the piezoelectric sensitivity. That is, the dielectric material of the ultrasonic transceiver 110 is polarized, and the dielectric material of the ultrasonic transceiver 110 can generate ultrasonic waves under driving of a high-voltage high-frequency signal.

For example, the dielectric material of the ultrasonic transceiver 110 may be made of a polarized polyvinylidene fluoride (i.e., PVDF) material, while the dielectric material of the reference transceiver 210 may be made of an unpolarized PVDF material.

In the present disclosure, there is no particular limitation on how the dielectric material of the ultrasonic transceiver 110 is caused to have the piezoelectric sensitivity. For example, the PVDF material may be polarized, and then, the polarized PVDF material may be disposed between two plates of the capacitor during the process of manufacturing the ultrasonic transceiver 110.

In the preferred embodiment provided by the present disclosure, the ultrasonic transceiver 110 and the reference transceiver 210 may be formed simultaneously; next, the unpolarized dielectric material in the ultrasonic transceiver 110 may be polarized. Specifically, the ultrasonic signal detection circuit 100 further includes a polarization voltage input terminal Pole which is electrically connected to the first input terminal of the first negative-voltage prevention sub-circuit 123 (i.e., electrically connected to the anode of the first one of the one or more second diodes D2 of the second diode unit 123b1). The unpolarized dielectric material in the ultrasonic transceiver 110 may be polarized by the voltage provided through the polarization voltage input terminal Pole, such that the dielectric material in the ultrasonic transceiver 110 has the piezoelectric sensitivity.

Specifically, during the polarization process, in the polarization process steps, the polarization voltage input terminal Pole is grounded through the glass plate 117, the first electrode of the ultrasonic transceiver 110 is connected to a negative high voltage, so that the second diodes D2 in FIG. 2 are conducted, and the dielectric layer material of the ultrasonic transceiver 110 is polarized under the high voltage.

In the present disclosure, the number of the ultrasonic signal detection circuits 100 and the number of the reference circuits 200 are not particularly limited. As an alternative embodiment, the number of reference circuits 200 is less than the number of ultrasonic signal detection circuits 100. For example, N>L.

In the present disclosure, the number of columns of the reference circuit 200 is not particularly limited. For example, 1 column of reference circuits 200 may be provided, as may a plurality of columns of reference circuits. For the $i^{th}$ row reference circuits of the plurality of columns of reference circuits, an average value of signals output from the plurality of columns of reference circuits may be used for calculating the system jitter, so that the calculation result is more accurate.

As an alternative, 1<L<5. Alternatively, N is 16 and L is 4. That is, the touch panel includes 16 columns of ultrasonic signal detection circuits 100 and 4 columns of reference circuits 200.

In the present disclosure, the number of rows of the ultrasonic signal detection circuits 100 is not particularly limited. For example, the touch panel may include 20 rows of ultrasonic signal detection circuits 100. Similarly, the touch panel also includes 20 rows of reference circuits 200.

Figure 9:
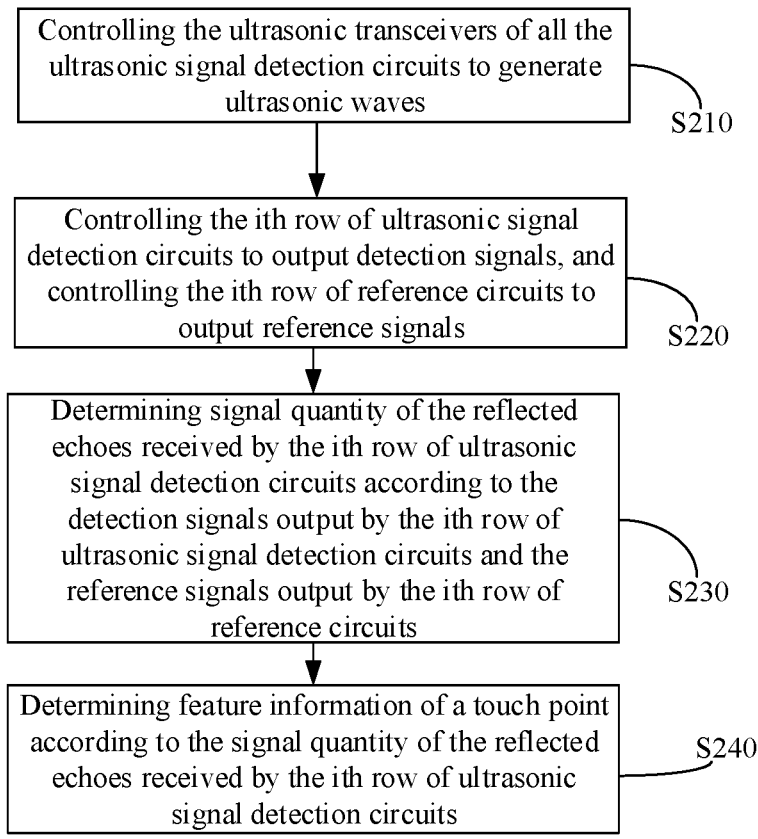
FIG. 9 is a flowchart of a touch recognition method according to the present disclosure.

As a second aspect of the present disclosure, a touch recognition method for a touch panel is provided, wherein the touch panel is the touch panel according to any one of the embodiments of the first aspect of the present disclosure. FIG. 9 is a flowchart of a touch recognition method according to the present disclosure. As shown in FIG. 9, the touch recognition method includes an ultrasonic emission stage and a recognition stage.

Specifically, in the ultrasonic emission stage, the touch recognition method includes steps of:

Step S210, controlling the ultrasonic transceivers of all the ultrasonic signal detection circuits to generate ultrasonic waves; and In the recognition stage, the touch recognition method includes steps of: Step S220, controlling the $i^{th}$ row of ultrasonic signal detection circuits to output detection signals, and controlling the $i^{th}$ row of reference circuits to output reference signals;

Step S230, determining signal quantity of the reflected echoes received by the $i^{th}$ row of ultrasonic signal detection circuits according to the detection signals output by the $i^{th}$ row of ultrasonic signal detection circuits and the reference signals output by the $i^{th}$ row of reference circuits;

Step S240, determining feature information of a touch point according to the signal quantity of the reflected echoes received by the $i^{th}$ row of ultrasonic signal detection circuits, wherein i is a variable and is sequentially taken from 1 to M.

The touch recognition method provided by the present disclosure may be used for driving the touch panel and determining the feature information of the touch point.

In the present disclosure, the ultrasonic transceivers may be driven by high-frequency high-voltage signals to generate ultrasonic waves. In the specific embodiment provided by the present disclosure, the high-frequency high-voltage driving signals may be simultaneously supplied to the driving signal lines Tx during the ultrasonic emission stage.

Figure 8:
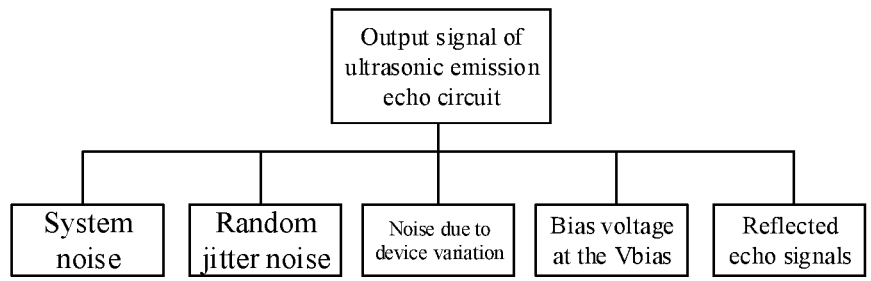
FIG. 8 illustrates components of an output signal of an ultrasonic signal detection circuit.

FIG. 8 illustrates components of an output signal of an ultrasonic signal detection circuit. As shown in FIG. 8, the signal output by the ultrasonic signal detection circuit includes the following components: system noise, random jitter noise, noise due to device variation, bias voltage at the Vbias, reflected echo signals. The components that cause measurement errors are system characteristics (including system noise, random jitter noise, noise due to device variation).

For the reference circuits located on the same row as the ultrasonic signal detection circuits, output signals of the reference circuits do not include the reflected echo signal, and the rest of the output signals of the reference circuits is the same as the signals output by the ultrasonic signal detection circuits. That is, the reference circuits located on the same row as the ultrasonic signal detection circuits output only the system characteristics (including system noise, random jitter noise, noise due to device variation) and the bias voltage at the Vbias.

Therefore, in step S230, the signal quantity causing the measurement error may be determined from the signal output from the $i^{th}$ row of the reference circuits. By using the touch recognition method provided by the present disclosure, when the feature information of the touch point is determined, the signals causing the measurement error may be reduced or even eliminated, so that the accuracy of touch recognition may be improved.

As described above, the feature information of the touch point includes a position of the touch point and/or the fingerprint topography at the touch point.

Figure 10:
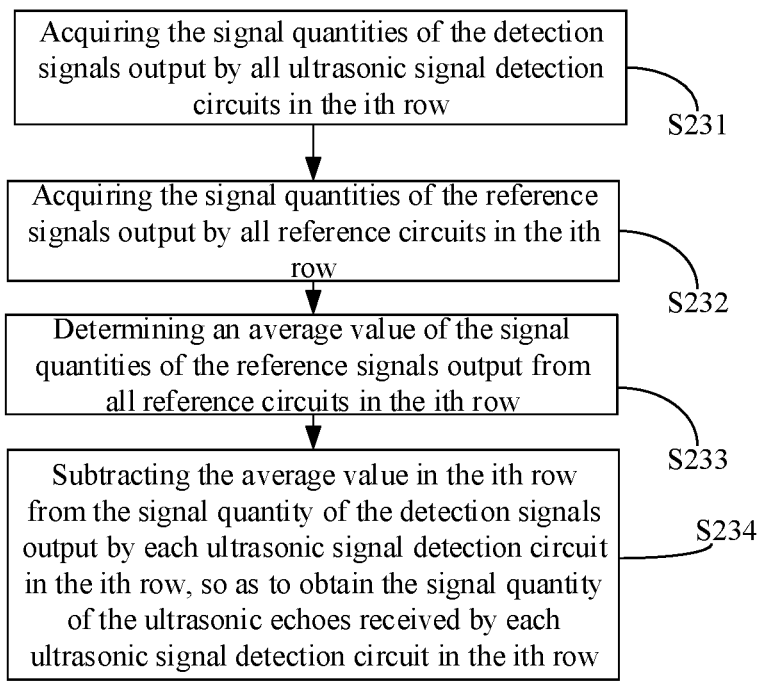
FIG. 10 is a schematic diagram of step S230.

In the present disclosure, the specific steps of step S230 are not particularly limited. FIG. 10 is a schematic diagram of step S230. Alternatively, as shown in FIG. 10, step S230 may include steps of:

Step S231, acquiring the signal quantities of the detection signals output by all ultrasonic signal detection circuits in the $i^{th}$ row;

Step S232, acquiring the signal quantities of the reference signals output by all reference circuits in the $i^{th}$ row;

Step S233, determining an average value of the signal quantities of the reference signals output from all reference circuits in the $i^{th}$ row;

Step S234, subtracting the average value in the $i^{th}$ row from the signal quantity of the detection signal output by each ultrasonic signal detection circuit in the $i^{th}$ row, so as to obtain the signal quantity of the ultrasonic echoes received by each ultrasonic signal detection circuit in the $i^{th}$ row.

Alternatively, if the touch panel includes only one column of reference circuits, the average value obtained in step S233 is the signal quantity obtained in step S232.

Optionally, the touch panel includes a plurality of columns of reference circuits, so that the reference circuits may reflect system characteristics more accurately and improve recognition accuracy. The principle of the touch recognition method will be described below with reference to a timing diagram shown in FIG. 12, the ultrasonic signal detection circuit shown in FIG. 2, and the reference circuit shown in FIG. 3.

Figure 12:
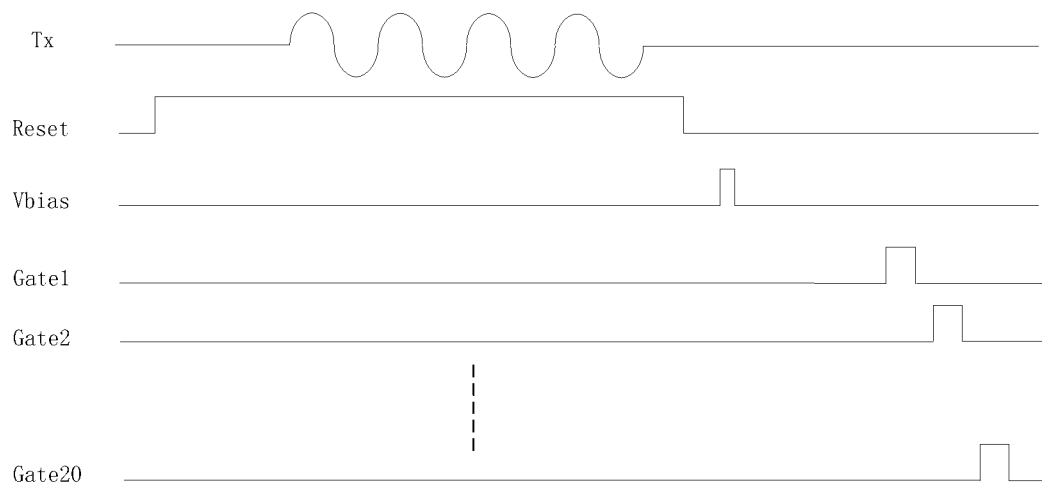
FIG. 12 is a timing diagram of signals in the touch recognition method.

FIG. 12 is a timing diagram of signals in the touch recognition method. As shown in FIG. 12, Gate1 represents a signal corresponding to a first row of scan line, Gate2 represents a signal corresponding to a second row of scan line, . . . , Gate20 represents a signal corresponding to a $20^{th}$ row of scan line. Tx represents a signal provided by the driving line, Reset denotes a signal from the reset line Reset, and Vbias represents a bias signal provided by the bias voltage input terminal. The output control signal is a high-level signal.

The touch recognition method further includes a reset step: resetting the $i^{th}$ row of the ultrasonic signal detection circuits and the $i^{th}$ row of the reference circuits, after the feature information of the touch point is determined according to the signal quantity of the reflected echoes received by the $i^{th}$ row of the ultrasonic signal detection circuits. At this time, an active level signal is supplied to the reset line so that the first reset transistor M0 and the second reset transistor T0 are conducted, and a low-level signal may be supplied through the bias voltage input terminal Vbias, discharging the gates of the first switch transistor M1 and the second switch transistor T1.

After the reset step, a high-level signal is provided to the bias voltage input terminal Vbias to conduct the first switch transistor M1, so that the ultrasonic transceiver arrives at a static operating voltage. In addition, the signal provided at the bias voltage input terminal Vbias is a pulse signal that may integrate the echo signals. Subsequently, steps of the recognition stage are performed: sequentially providing high-level output control signals to respective rows of scan lines Gate, so as to conduct the first and second electrodes of each first output transistor M2 of respective rows of ultrasonic signal detection circuits, and to conduct the first and second electrodes of each second output transistor M2 of respective rows of reference circuits, so that each first output transistor M2 outputs a sensing signal affected by the signal output from the ultrasonic transceiver and each second output transistor T2 outputs the reference signal. In the embodiment of the present disclosure, sequentially providing high-level output control signals to respective rows of scan lines Gate means that the high-level output control signals provided to respective rows of scan lines Gate have a certain time delay, as shown in FIG. 12.

In the present disclosure, the reset step may be performed in synchronization with step S210.

Figure 11:
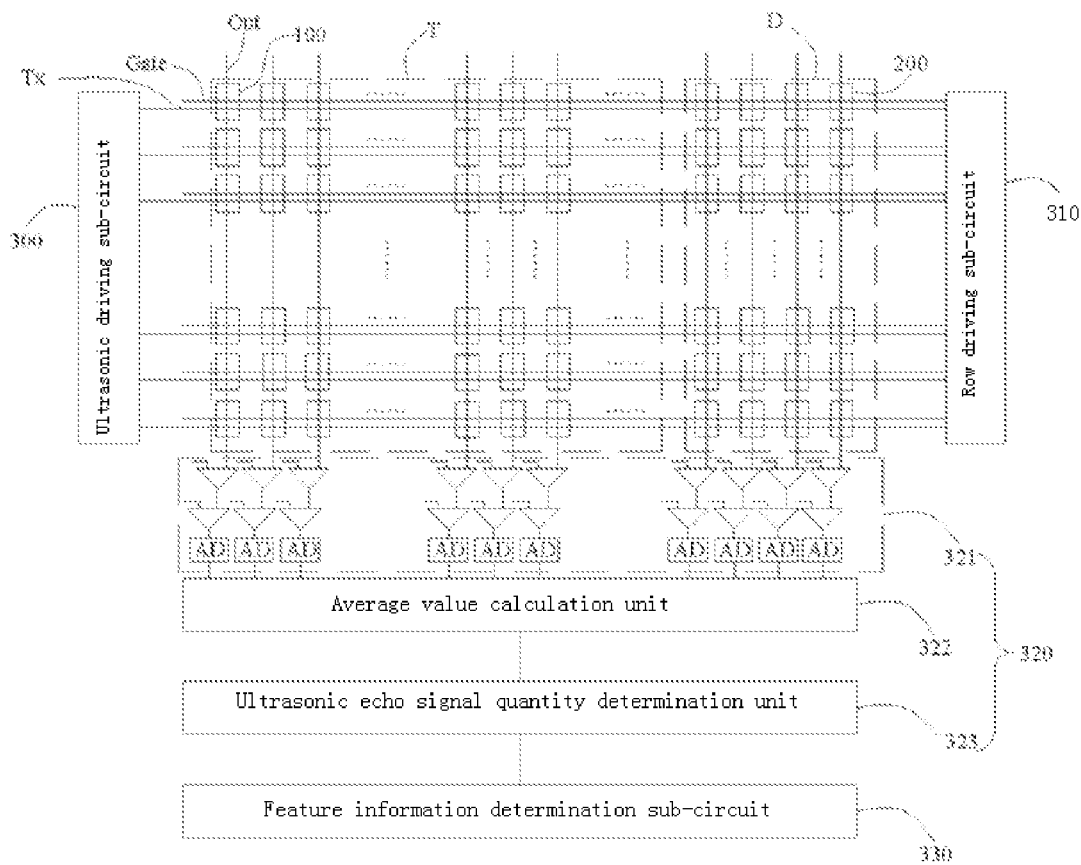
FIG. 11 is a schematic diagram of a touch panel and a touch driving circuit of a touch device according to the present disclosure.

As a third aspect of the present disclosure, a touch driving circuit is provided. FIG. 11 is a schematic diagram of a touch panel and a touch driving circuit of a touch device according to the present disclosure. As shown in FIG. 11, the touch driving circuit includes:

an ultrasonic driving sub-circuit 300 configured to control the ultrasonic transceivers of all the ultrasonic signal detection circuits to generate ultrasonic waves;

a row driving sub-circuit 310 configured to sequentially control the 1st to Mth rows of the ultrasonic signal detection circuits to output detection signals, and control the 1st to Mth rows of the reference circuits to output reference signals;

a signal quantity determination sub-circuit 320 configured to determine signal quantity of the reflected echoes received by the $i^{th}$ row of ultrasonic signal detection circuits according to the detection signals output by the $i^{th}$ row of ultrasonic signal detection circuits and the reference signals output by the $i^{th}$ row of reference circuits;

a feature information determination sub-circuit 330 configured to determine feature information of a touch point according to the signal quantity of the reflected echoes received by the $i^{th}$ row of ultrasonic signal detection circuits, wherein i is a variable and is sequentially taken from 1 to M.

In the present disclosure, the ultrasonic driving sub-circuit 300 may have a circuit structure that provides a high-frequency high-voltage signal.

The touch driving circuit is configured to execute the touch recognition method provided by the present disclosure, and the working principle and the beneficial effects of the touch driving circuit have been described in detail above, which is not described herein again.

As an alternative embodiment, the row driving sub-circuit 310 may be a shift register.

As described above, the feature information of the touch point includes the position of the touch point and/or the fingerprint topography at the touch point. Accordingly, the feature information determination sub-circuit 330 is configured to determine the position of the touch point and/or the fingerprint topography at the touch point according to the signal quantity of the reflected echoes received by the $i^{th}$ row of ultrasonic signal detection circuits.

Alternatively, as shown in FIG. 11, the signal quantity determination sub-circuit 320 includes:

a signal quantity acquisition unit 321 configured to acquire the signal quantities of the detection signals output by all ultrasonic signal detection circuits in the $i^{th}$ row and acquire the signal quantities of the reference signals output by all reference circuits in the $i^{th}$ row;

an average value calculation unit 322 configured to determine an average value of the signal quantities of the reference signals output from all reference circuits in the $i^{th}$ row;

an ultrasonic echo signal quantity determination unit 323 configured to subtract the average value in the $i^{th}$ row from the signal quantity of the detection signal output by each ultrasonic signal detection circuit in the $i^{th}$ row, so as to obtain the signal quantity of the ultrasonic echo received by each ultrasonic signal detection circuit in the $i^{th}$ row.

In the present disclosure, the signal quantity acquisition unit 321 may include differential amplifiers configured to convert a current signal into a voltage signal and operational amplifiers configured to amplify the voltage signal. The average value calculation unit 322 and the ultrasonic echo signal quantity determination unit 323 may be chips having a calculation function.

Figure 6:
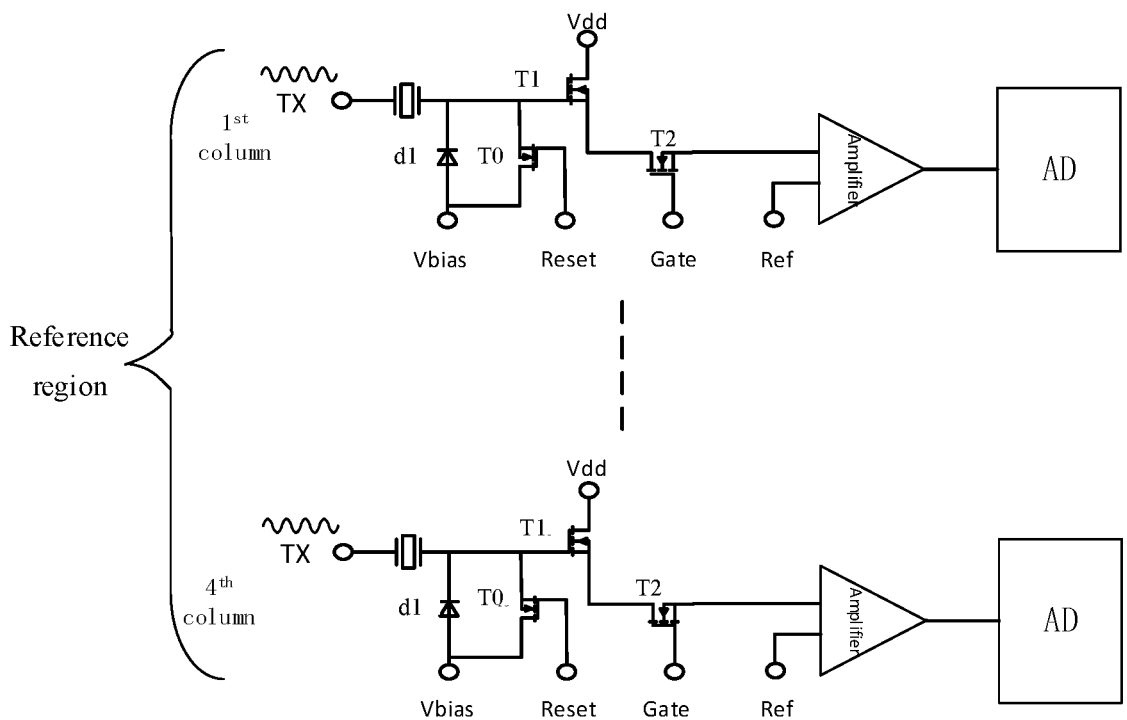
FIG. 6 is an equivalent circuit diagram of a reference region in fingerprint recognition.
Figure 7:
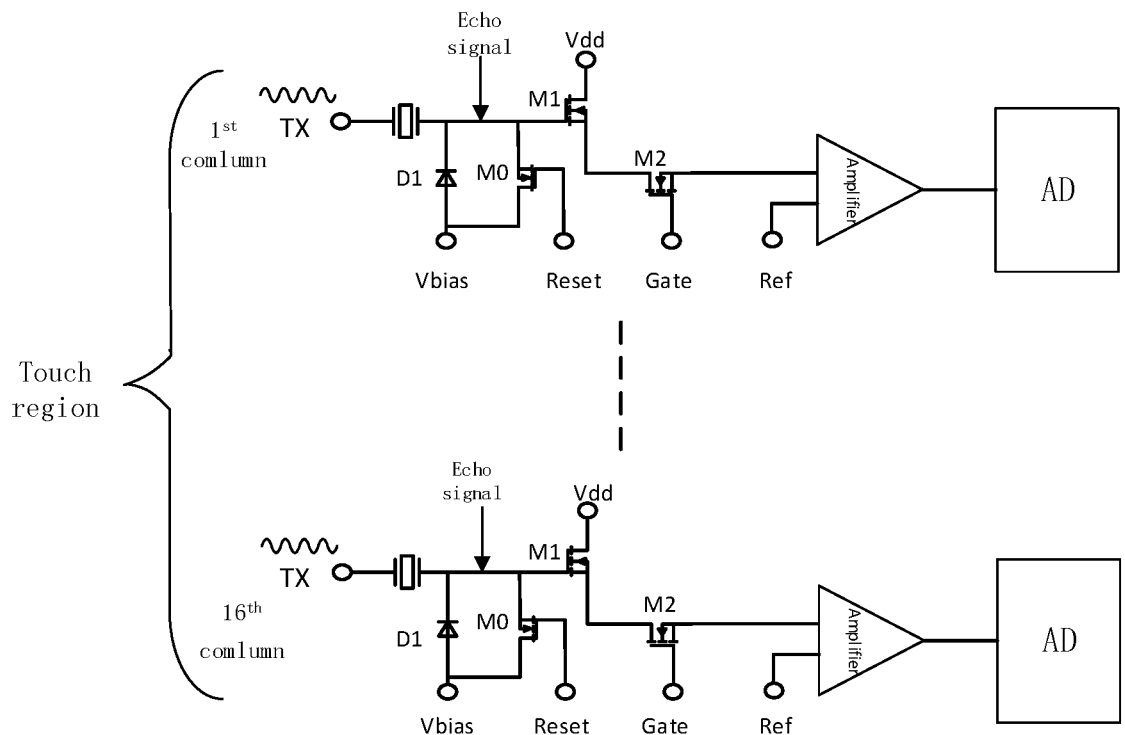
FIG. 7 is an equivalent circuit diagram of a touch region in fingerprint recognition.

FIG. 6 is an equivalent circuit diagram of a reference region in fingerprint recognition. FIG. 7 is an equivalent circuit diagram of a touch region in fingerprint recognition. In order to obtain a more accurate calculation result, optionally, as shown in FIGS. 6 and 7, the touch panel further includes a plurality of operational amplifiers and a plurality of analog-to-digital converters, where each column of the ultrasonic signal detection circuits and each column of the reference circuits correspond to a corresponding operational amplifier, and an output terminal of each operational amplifier is connected to one of the analog-to-digital converters (i.e., AD as shown in in FIGS. 6 and 7). The polarization voltage input terminal Pole in each ultrasonic signal detection circuit 100 is not shown in FIG. 7. In the embodiment of the present disclosure, the plurality of ultrasonic signal detection circuits 100 in each column are connected in sequence, and the last ultrasonic signal detection circuit 100 in the series connection is connected to an operational amplifier, and an output terminal of the operational amplifier is connected to one of the analog-to-digital converters (i.e., AD in FIGS. 6 and 7). In an embodiment of the present disclosure, the plurality of reference circuits 200 in each column are connected in sequence, and the last reference circuit 200 in the series connection is connected to an operational amplifier, and an output terminal of the operational amplifier is connected to one of the analog-to-digital converters (i.e., AD in FIGS. 6 and 7). In FIGS. 6 and 7, for convenience of explanation, only one corresponding circuit in each column (one ultrasonic signal detection circuit 100 or one reference circuit 200) connected to the operational amplifier and the analog-to-digital converter is shown, and the other circuits are omitted.

The operational amplifier is configured to amplify a received signal, and the analog-to-digital converter is configured to convert a received analog signal to a digital signal. In the embodiments shown in FIGS. 6 and 7, one input terminal of the operational amplifier is electrically connected to the signal line Out, and the other input terminal of the operational amplifier is electrically connected to a reference voltage terminal Ref.

As a fourth aspect of the present disclosure, a touch device is provided, where the touch device includes a touch panel and a touch driving circuit, where the touch panel is the touch panel according to any one of the embodiments of the first aspect of the present disclosure, and the touch driving circuit is the touch driving circuit according to any one of the embodiments of the third aspect of the present disclosure.

The touch device according to the embodiment of the present disclosure may be applied to a touch display device. The touch display device further includes a display panel.

In the present disclosure, a relative positional relationship between the touch panel and the display panel is not particularly limited. For example, the touch panel may be disposed on a frame of the touch display device for fingerprint recognition.

Alternatively, the touch panel may also be stacked on the display panel, and it should be noted that the touch panel should not affect the normal display of the display panel. For example, the touch panel may be disposed on a backlight side of the display panel. Alternatively, the circuits (including the ultrasonic signal detection circuit and the reference circuit) of the touch panel may be disposed at a black matrix of the display panel, so as not to affect the normal display of the display panel.

Because the reference circuits are provided in the touch device provided by the embodiment of the present disclosure, the influence of the system characteristics on the touch recognition result may be reduced or even eliminated.

In an embodiment of the present disclosure, a value of the root mean square (RMS) of the signal of the touch panel may be obtained according to formula (1):

$$\text{RMS} = \frac{\sqrt{(x_1 - \overline{x})^2 + (x_2 - \overline{x})^2 + \ldots + (x_n - \overline{x})^2}}{\sqrt{n}} \quad (1)$$

where $x_n$ represents the nth frame of data obtained by subtracting the average of the reference region from the touch region data; $\overline{x}$ represents the average of n frames of data.

In the embodiment of the present disclosure, the RMS value is calculated, for example, by subtracting the average of 50 frames of data from each frame of data, where each frame of data includes 320 data in 20 rows and 16 columns (data of 320 signals output by ultrasonic signal detection circuits 100 in 20 rows and 12 columns and reference circuits 200 in 20 rows and 4 columns).

A signal-to-noise ratio is equal to the echo signal quantity divided by the root mean square value. The improved root mean square value has following noise reduction effect as shown in the table.

| Original root mean square value | Improved root mean square value | Noise reduction effect | Signal to noise ratio enhancement effect |
| --- | --- | --- | --- |
| 39 | 25 | 35% | 35% |

It should be understood that the above embodiments are merely exemplary embodiments adopted to explain the principles of the present disclosure, and the present disclosure is not limited thereto. It will be apparent to one of ordinary skill in the art that various changes and modifications may be made therein without departing from the spirit and scope of the present disclosure, and these changes and modifications also fall within the scope of the present disclosure.

What is claimed is:

1. A touch panel, comprising a touch region and a reference region, wherein the touch region comprises a plurality of ultrasonic signal detection circuits, and the reference region comprises a plurality of reference circuits, each of the plurality of ultrasonic signal detection circuits comprises an ultrasonic sensor and a first driving circuit; the ultrasonic sensor comprises a first electrode, a second electrode, and a dielectric layer between the first electrode and the second electrode, the first driving circuit is configured to drive the ultrasonic sensor such that the ultrasonic signal detection circuit outputs a detection signal according to a driving signal provided by the first driving circuit and an ultrasonic echo signal received by the ultrasonic sensor;

each of the plurality of reference circuits comprises a reference transceiver and a second driving circuit, the reference transceiver comprises a third electrode, a fourth electrode, and a dielectric layer between the third electrode and the fourth electrode; the second driving circuit is configured to drive the reference transceiver such that the reference circuit outputs a reference signal according to a driving signal provided by the second driving circuit;

the dielectric layer of the ultrasonic sensor is made of a polarized piezoelectric material and has piezoelectric sensitivity; and the dielectric layer of the reference transceiver is made of an un-polarized piezoelectric material but does not have the piezoelectric sensitivity.

2. The touch panel according to claim 1, wherein the plurality of ultrasonic signal detection circuits and the plurality of reference circuits are arranged in an array, the plurality of ultrasonic signal detection circuits are arranged in M rows and N columns, and the plurality of reference circuits are arranged in M rows and L columns;

where M and N are positive integers greater than 1, L is a positive integer not less than 1.

3. The touch panel according to claim 2, further comprising a plurality of scan lines, a plurality of signal lines, and a plurality of driving lines, wherein the plurality of scan lines each are configured to provide an output control signal, reference circuits and ultrasonic signal detection circuits in a same row share a same scan line; reference circuits and ultrasonic signal detection circuits in a same row share a same driving line;

reference circuits in a same column share a same signal line, and ultrasonic signal detection circuits in a same column share a same signal line;

the third electrode of the reference transceiver is electrically connected to a corresponding driving line, the fourth electrode of the reference transceiver is electrically connected to a driving control terminal of the second driving circuit, an output control terminal of the second driving circuit is electrically connected to a corresponding scan line, an input terminal of the second driving circuit is electrically connected to a high-level signal terminal, an output terminal of the second driving circuit is electrically connected to a corresponding signal line, and the input terminal of the second driving circuit and the output terminal of the second driving circuit are conducted when the output control terminal of the second driving circuit receives the output control signal, and the reference circuit outputs the reference signal according to a driving signal provided by the driving line;

the first electrode of the ultrasonic sensor is electrically connected to a corresponding driving line, the second electrode of the ultrasonic sensor is electrically connected to a driving control terminal of the first driving circuit, an output control terminal of the first driving circuit is electrically connected to a corresponding scan line, an input terminal of the first driving circuit is electrically connected to the high-level signal terminal, an output terminal of the first driving circuit is electrically connected to a corresponding signal line, and the input terminal of the first driving circuit and the output terminal of the first driving circuit are conducted when the output control terminal of the first driving circuit receives the output control signal, and the ultrasonic signal detection circuit outputs the detection signal according to the driving signal provided by the driving line and received ultrasonic echo signals.

4. The touch panel according to claim 3, wherein the first driving circuit comprises a first switch sub-circuit, a first output sub-circuit, a first protection sub-circuit, and a bias voltage input terminal,
- a control terminal of the first switch sub-circuit is the driving control terminal of the first driving circuit, and the second electrode of the ultrasonic sensor is electrically connected to the control terminal of the first switch sub-circuit;
- an input terminal of the first switch sub-circuit is the input terminal of the first driving circuit, an output terminal of the first switch sub-circuit is electrically connected to an input terminal of the first output sub-circuit, and a current output by the output terminal of the first switch sub-circuit is related to a voltage received by the control terminal of the first switch sub-circuit;
- a control terminal of the first output sub-circuit is electrically connected to the scan line corresponding to the ultrasonic signal detection circuit, and when the control terminal of the first output sub-circuit receives the output control signal, the input terminal of the first output sub-circuit and the output terminal of the first output sub-circuit are conducted, so as to output the current output from the output terminal of the first switch sub-circuit to the input terminal of the first output sub-circuit;
- an input of the first protection sub-circuit is electrically connected to the bias voltage input terminal, a first terminal of the first protection sub-circuit is electrically connected to a low-level signal terminal, a second terminal of the first protection sub-circuit is electrically connected to a power supply voltage terminal, an output terminal of the first protection sub-circuit is electrically connected to the control terminal of the first switch sub-circuit, the first protection sub-circuit allows a current flowing from the bias voltage input terminal to the output terminal of the first protection sub-circuit to pass therethrough, and cuts off a current flowing from the output terminal of the first protection sub-circuit to the input terminal of the first protection sub-circuit.

5. The touch panel according to claim 4, wherein the first switch sub-circuit comprises a first switch transistor, a gate of the first switch transistor is the control terminal of the first switch sub-circuit and is electrically connected to the second electrode of the ultrasonic sensor, a first electrode of the first switch transistor is the input terminal of the first switch sub-circuit and is electrically connected to the high-level signal terminal, and a second electrode of the first switch transistor is the output terminal of the first switch sub-circuit and is electrically connected to the input terminal of the first output sub-circuit.

6. The touch panel according to claim 5, wherein the first output sub-circuit comprises a first output transistor, a gate of the first output transistor is the control terminal of the first output sub-circuit and is electrically connected to a corresponding gate line, a first electrode of the first output transistor is the input terminal of the first output sub-circuit and is electrically connected to the output terminal of the first switch sub-circuit, and a second electrode of the first output transistor is the output terminal of the first output sub-circuit.

7. The touch panel according to claim 6, wherein the first protection sub-circuit comprises a first unidirectional sub-unit and a first clamping sub-unit;
- a first terminal of the first unidirectional sub-unit is the output terminal of the first protection sub-circuit, the first unidirectional sub-unit allows a current flowing from a second terminal of the first unidirectional sub-unit to the first terminal of the first unidirectional sub-unit to pass therethrough, and the first unidirectional sub-unit cuts off a current flowing from the first terminal of the first unidirectional sub-unit to the second terminal of the first unidirectional sub-unit, and the second terminal of the first unidirectional sub-unit is the input terminal of the first protection sub-circuit and is electrically connected to the bias voltage input terminal;
- a first terminal of the first clamping sub-unit is electrically connected to the low-level signal terminal, a second terminal of the first clamping sub-unit is electrically connected to the power supply voltage terminal, the bias voltage input terminal is electrically connected to an output terminal of the first clamping sub-unit, the first clamping sub-unit allows a current to flow from the first terminal of the first clamping sub-unit to the second terminal of the first clamping sub-unit, and the first clamping sub-unit is capable of cutting off a current flowing from the second terminal of the first clamping sub-unit to the first terminal of the first clamping sub-unit, the first clamping sub-unit is configured to limit a voltage at the bias voltage input terminal between a voltage input from the low-level signal terminal and a voltage input from the power supply voltage terminal.

8. The touch panel according to claim 7, wherein the first unidirectional sub-unit comprises a first diode, an anode of the first diode is the second terminal of the first unidirectional sub-unit and is electrically connected to the bias voltage input terminal, and a cathode of the first diode is the first terminal of the first unidirectional sub-unit and is electrically connected to the control terminal of the first switch sub-circuit.

9. The touch panel according to claim 8, wherein the first clamping sub-unit comprises a second diode unit and a third diode unit in series, the bias voltage input terminal is electrically connected at a series point of the second diode unit and the third diode unit,
- the second diode unit comprises a second diode, an anode of the second diode is the first terminal of the first clamping sub-unit and is electrically connected to the low-level signal terminal, the third diode unit comprises a third diode, an anode of the third diode is connected to the cathode of the second diode, and a cathode of the third diode is the second terminal of the first clamping sub-unit and is electrically connected to the power supply voltage terminal; or
- the second diode unit comprises a plurality of second diodes in series, the third diode unit comprises a plurality of third diodes in series, an anode of the second diode at a start position is the first terminal of the first clamping sub-unit and is electrically connected to the low-level signal terminal, a cathode of the second diode at an end position is electrically connected to an anode of the third diode at a start position, and a cathode of the third diode at an end position is the second terminal of the first clamping sub-unit and is electrically connected to the power supply voltage terminal.

10. The touch panel according to claim 9, wherein the touch panel further comprises a plurality of reset lines, one of which corresponds to each row of the ultrasonic signal detection circuits, and the ultrasonic signal detection circuits and the reference circuits in a same row share a same reset line;

the first driving circuit further comprises a first reset sub-circuit, a control terminal of the first reset sub-circuit is electrically connected to a reset line, an output terminal of the first reset sub-circuit is electrically connected to the control terminal of the first switch sub-circuit, an input terminal of the first reset sub-circuit is electrically connected to the bias voltage input terminal, and the input terminal of the first reset sub-circuit and the output terminal of the first reset sub-circuit are configured to be conducted when the control terminal of the first reset sub-circuit receives a reset signal.

11. The touch panel according to claim 10, wherein the first reset sub-circuit comprises a first reset transistor, a gate of the first reset transistor is the control terminal of the first reset sub-circuit and is electrically connected to a corresponding reset line, a first electrode of the first reset transistor is the input terminal of the first reset sub-circuit and is electrically connected to the bias voltage input terminal, and a second electrode of the first reset sub-circuit is the output terminal of the first reset sub-circuit and is electrically connected to the control terminal of the first switch sub-circuit.

12. The touch panel according to claim 11, wherein the ultrasonic signal detection circuit further comprises a voltage input terminal electrically connected to an anode of a first one of the one or more second diodes of the second diode unit of the first protection sub-circuit.

13. The touch panel according to claim 11, wherein the second driving circuit comprises a second switch sub-circuit, a second reset sub-circuit, and a bias voltage input terminal, a control terminal of the second switch sub-circuit is the driving control terminal of the second driving circuit, and the fourth electrode of the reference transceiver is electrically connected to the control terminal of the second switch sub-circuit;

a control terminal of the second reset sub-circuit is electrically connected to the reset line, an output terminal of the second reset sub-circuit is electrically connected to the control terminal of the second switch sub-circuit, an input terminal of the second reset sub-circuit is electrically connected to the bias voltage input terminal, and the input terminal of the second reset sub-circuit and the output terminal of the second reset sub-circuit are configured to be conducted when the control terminal of the second reset sub-circuit receives the reset signal;

wherein the second reset sub-circuit comprises a second reset transistor, a gate of the second reset transistor is the control terminal of the second reset sub-circuit and is electrically connected to a corresponding reset line, a first electrode of the second reset transistor is the input terminal of the second reset sub-circuit and is electrically connected to the bias voltage input terminal, and a second electrode of the second reset sub-circuit is the output terminal of the second reset sub-circuit and is electrically connected to a control terminal of the second switch sub-circuit.

14. The touch panel according to claim 13, wherein N>L, and 1<L<5.

15. A touch recognition method for a touch panel, wherein the touch panel is the touch panel according to claim 13, the touch recognition method comprises an ultrasonic emission stage and a recognition stage, wherein, in the ultrasonic emission stage, the touch recognition method comprises a step of: controlling the ultrasonic sensors of all the ultrasonic signal detection circuits to generate ultrasonic waves; and in the recognition stage, the touch recognition method comprises steps of:

controlling the $i^{th}$ row of ultrasonic signal detection circuits to output detection signals, and controlling the $i^{th}$ row of reference circuits to output reference signals, wherein i is a variable and is sequentially taken from 1 to M;

determining signal quantity of reflected echoes received by the $i^{th}$ row of ultrasonic signal detection circuits according to the detection signals output by the $i^{th}$ row of ultrasonic signal detection circuits and the reference signals output by the $i^{th}$ row of reference circuits;

determining feature information of a touch point according to the signal quantity of the reflected echoes received by the $i^{th}$ row of ultrasonic signal detection circuits.

16. The touch recognition method according to claim 15, wherein the feature information of the touch point comprises a position of the touch point and/or a fingerprint topography at the touch point.

17. The touch recognition method according to claim 15, wherein the step of determining signal quantity of reflected echoes received by the $i^{th}$ row of ultrasonic signal detection circuits according to the detection signals output by the $i^{th}$ row of ultrasonic signal detection circuits and the reference signals output by the $i^{th}$ row of reference circuits comprises steps of:

acquiring the signal quantities of the detection signals output by all ultrasonic signal detection circuits in the $i^{th}$ row;

acquiring the signal quantities of the reference signals output by all reference circuits in the $i^{th}$ row;

determining an average value of the signal quantities of the reference signals output from all reference circuits in the $i^{th}$ row;

subtracting the average value in the $i^{th}$ row from the signal quantity of the detection signal output by each ultrasonic signal detection circuit in the $i^{th}$ row, so as to obtain the signal quantity of the reflected echoes received by each ultrasonic signal detection circuit in the $i^{th}$ row.

18. The touch recognition method according to claim 15, wherein the touch recognition method further comprises a reset step, and a bias voltage supplying step between the ultrasonic emission stage and the recognition stage, the reset step comprises: resetting the $i^{th}$ row of the ultrasonic signal detection circuits and the $i^{th}$ row of the reference circuits, after the feature information of the touch point is determined according to the signal quantity of the reflected echoes received by the $i^{th}$ row of the ultrasonic signal detection circuits the bias voltage supplying step comprises: providing a high-level signal to the second electrode of the ultrasonic sensor through the bias voltage input terminal.

19. A touch device comprising a touch panel and a touch driving circuit configured to drive the touch panel, wherein the touch panel is the touch panel according to claim 13, the touch driving circuit comprises:

an ultrasonic driving sub-circuit configured to control the ultrasonic sensors of all the ultrasonic signal detection circuits to generate ultrasonic waves;

a row driving sub-circuit configured to sequentially control the $1^{st}$ to $M^{th}$ rows of the ultrasonic signal detection circuits to output detection signals, and control the $1^{st}$ to $M^{th}$ rows of the reference circuits to output reference signals;

a signal quantity determination sub-circuit configured to determine signal quantity of the reflected echoes received by the $i^{th}$ row of ultrasonic signal detection circuits according to the detection signals output by the $i^{th}$ row of ultrasonic signal detection circuits and the reference signals output by the $i^{th}$ row of reference circuits, wherein i is a variable and is sequentially taken from 1 to M; and a feature information determination sub-circuit configured to determine feature information of a touch point according to the signal quantity of the reflected echoes received by the $i^{th}$ row of ultrasonic signal detection circuits.

20. The touch device according to claim 19, wherein the feature information of the touch point comprises a position of the touch point and/or a fingerprint topography at the touch point, and the feature information determination sub-circuit is configured to determine the position of the touch point and/or the fingerprint topography at the touch point according to the signal quantity of the reflected echoes received by the $i^{th}$ row of ultrasonic signal detection circuits, wherein the signal quantity determination sub-circuit comprises:

a signal quantity acquisition unit configured to acquire the signal quantities of the detection signals output by all ultrasonic signal detection circuits in the $i^{th}$ row and acquire the signal quantities of the reference signals output by all reference circuits in the $i^{th}$ row;

an average value calculation unit configured to determine an average value of the signal quantities of the reference signals output from all reference circuits in the $i^{th}$ row;

an ultrasonic echo signal quantity determination unit configured to subtract the average value in the $i^{th}$ row from the signal quantity of the detection signal output by each ultrasonic signal detection circuit in the $i^{th}$ row, so as to obtain the signal quantity of the reflected echoes received by each ultrasonic signal detection circuit in the $i^{th}$ row.

* * * * *